(12) United States Patent
Shin et al.

(10) Patent No.: US 11,096,222 B2
(45) Date of Patent: Aug. 17, 2021

(54) METHOD FOR TRANSMITTING AND RECEIVING RANDOM ACCESS PREAMBLE IN WIRELESS COMMUNICATION SYSTEM AND APPARATUS THEREFOR

(71) Applicant: LG Electronics Inc., Seoul (KR)

(72) Inventors: Seokmin Shin, Seoul (KR); Changhwan Park, Seoul (KR); Seonwook Kim, Seoul (KR); Joonkui Ahn, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/578,106

(22) Filed: Sep. 20, 2019

(65) Prior Publication Data

US 2020/0015285 A1    Jan. 9, 2020

Related U.S. Application Data

(63) Continuation of application No. PCT/KR2018/003377, filed on Mar. 22, 2018.
(Continued)

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
CPC . H04W 88/10; H04W 72/0446; H04W 80/02; H04L 1/0005
See application file for complete search history.

(56) References Cited

U.S. PATENT DOCUMENTS

| 7,158,542 B1 * | 1/2007 | Zeng | H04L 7/042 370/252 |
| 2013/0083749 A1 | 4/2013 | Xu et al. | |

(Continued)

FOREIGN PATENT DOCUMENTS

| KR | 20080112119 | 12/2008 |
| KR | 20100109617 | 10/2010 |

(Continued)

OTHER PUBLICATIONS

Huawei, HiSilicon, Neul Ltd., "NPRACH on a non-anchor NB-IoT Carrier," R2-1701437, 3GPP TSG-RAN WG2 Meeting #97, Athens, Greece, Feb. 13-17, 2017, 10 pages.
(Continued)

*Primary Examiner* — Zhiren Qin
(74) *Attorney, Agent, or Firm* — Fish & Richardson P.C.

(57) ABSTRACT

Disclosed are a method for transmitting a random access preamble in a wireless communication system supporting a narrowband-Internet of things (NB-IoT) and an apparatus therefor. Specifically, the method performed by the terminal may include: receiving, from a base station, first configuration information for a first random access preamble and second configuration information for a second random access preamble; transmitting, to the base station, the first random access preamble by using the first configuration information; and transmitting, to the base station, the second random access preamble based on the second configuration information, when transmission of the first random access preamble satisfies a predetermined criterion, in which any one of the first random access preamble and the second random access preamble may be generated based on a sequence in which all elements are not configured to 1.

11 Claims, 11 Drawing Sheets

Related U.S. Application Data

(60) Provisional application No. 62/492,984, filed on May 2, 2017, provisional application No. 62/475,193, filed on Mar. 22, 2017.

(56) References Cited

U.S. PATENT DOCUMENTS

| | | | | |
|---|---|---|---|---|
| 2013/0272343 | A1* | 10/2013 | Zhang | H04L 25/0212 |
| | | | | 375/148 |
| 2014/0098761 | A1* | 4/2014 | Lee | H04W 24/02 |
| | | | | 370/329 |
| 2014/0112286 | A1 | 4/2014 | Alm et al. | |
| 2015/0016312 | A1* | 1/2015 | Li | H04W 74/006 |
| | | | | 370/280 |
| 2015/0181624 | A1* | 6/2015 | Hwang | H04L 5/0053 |
| | | | | 370/329 |
| 2016/0255591 | A1 | 9/2016 | Park et al. | |
| 2017/0264466 | A1* | 9/2017 | Hosseini | H04L 25/0236 |
| 2017/0295596 | A1* | 10/2017 | Chen | H04L 5/0053 |
| 2018/0069750 | A1* | 3/2018 | Yoo | H04L 41/08 |
| 2018/0131498 | A1* | 5/2018 | Chen | H04L 5/0092 |
| 2018/0167979 | A1* | 6/2018 | Guo | H04W 16/28 |
| 2018/0242367 | A1 | 8/2018 | Kim et al. | |
| 2018/0317180 | A1* | 11/2018 | Li | H04W 52/242 |
| 2019/0014598 | A1* | 1/2019 | Yoshimura | H04W 74/006 |
| 2019/0149984 | A1* | 5/2019 | Takeda | H04L 1/1864 |
| | | | | 370/328 |
| 2019/0230499 | A1* | 7/2019 | Sun | H04L 5/00 |
| 2019/0261430 | A1* | 8/2019 | Qin | H04L 5/00 |

FOREIGN PATENT DOCUMENTS

| | | |
|---|---|---|
| KR | 20140003633 | 1/2014 |
| KR | 20140107185 | 9/2014 |
| KR | 20150005532 | 1/2015 |
| KR | 20150044366 | 4/2015 |
| WO | WO2017014715 | 1/2017 |
| WO | WO2017030412 | 2/2017 |

OTHER PUBLICATIONS

Nokia Networks, Alcatel-Lucent, Alcatel-Lucent Shanghai Bell, "Random Access procedure for NB-IoT," R2-161526, 3GPP TSG-RAN WG2 Meeting #93, St. Julian's, Malta, Feb. 15-19, 2016, 6 pages.

Japanese Office Action in Japanese Appln. No. 2019-552235, dated Oct. 20, 2020, 5 pages (with English translation).

EP extended European search report, in European Appln. No. 18770566.0, dated Jan. 12, 2021, 7 pages.

Ericsson, "Introduction of NB-IoT enhancements," R1-1701877, 3GPP TSG-RAN1 Meeting #88, Athens, Greece, Feb. 13-17, 2017, 22 pages.

Ericsson, "NB-IoT—NPRACH Configurations," R1-161835, 3GPP TSG RAN WG1 NB-IoT Ad-Hoc Meeting, Sophia Antipolis, France, Mar. 22-24, 2016, 14 pages.

InterDigital, "PRACH for NB-IoT," R1-161918, 3GPP TSG RAN WG1 NB-IoT Ad-Hoc Meeting, Sophia Antipolis, France, Mar. 22-24, 2016, 2 pages.

Korean Notice of Allowance in Korean Appln. No. 10-2020-7017890, dated Jul. 2, 2020, 5 pages (with English translation).

Nokia Networks, Alcatel-Lucent, Alcatel-Lucent Shanghai Bell, "Remaining issues on random access procedure for NB-IoT," R1-161854, 3GPP TSG-RAN WG1 NB-IoT Ad-Hoc Meeting, Sophia Antipolis, France, Mar. 22-24, 2016, 2 pages.

* cited by examiner

FIG. 8
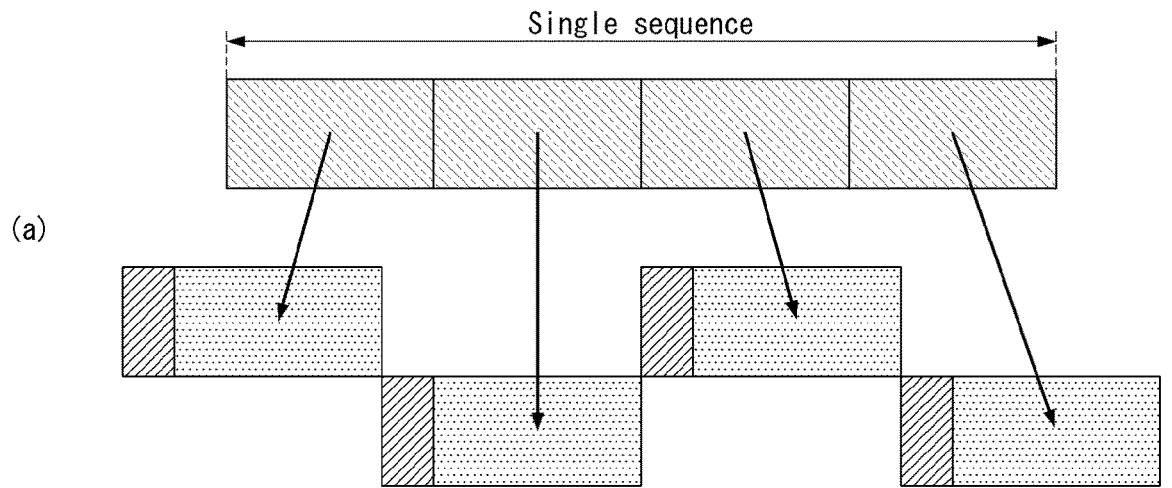
(a)
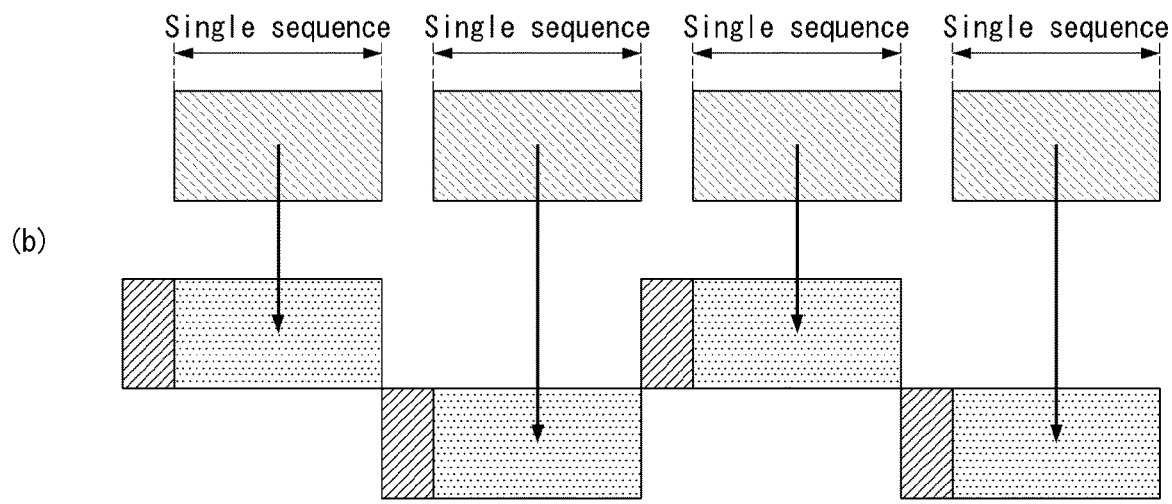
(b)
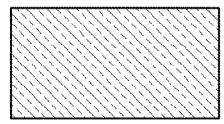 : sequence
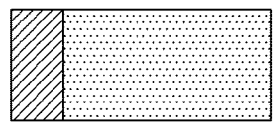 : PRACH unit

METHOD FOR TRANSMITTING AND RECEIVING RANDOM ACCESS PREAMBLE IN WIRELESS COMMUNICATION SYSTEM AND APPARATUS THEREFOR

CROSS-REFERENCE TO RELATED APPLICATION

This application is a continuation of International Application No. PCT/KR2018/003377, filed on Mar. 22, 2018, which claims the benefit of U.S. Provisional Application No. 62/475,193, filed on Mar. 22, 2017 and U.S. Provisional Application No. 62/492,984, filed on May 2, 2017. The contents of which are all hereby incorporated by reference herein in their entirety.

TECHNICAL FIELD

The present disclosure relates to a method for transmitting and receiving a random access preamble in a wireless communication system, and more particularly, to a method for transmitting and receiving a random access preamble in a wireless communication system supporting NarrowBand-Internet of Things (NB-IoT) and an apparatus for supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

This specification proposes a method for transmitting and receiving a random access preamble in a wireless communication system supporting NarrowBand-Internet of Things (NB-IoT).

This specification proposes a method for configuring configuration information for each preamble when a new NPRACH preamble is supported in addition to an existing NPRACH preamble.

Furthermore, this specification proposes a method for selecting a preamble to be used in a random access procedure by a terminal based on a specific criterion (or configuration) when a new NPRACH preamble is supported.

The technical objects of the present disclosure are not limited to the aforementioned technical objects, and other technical objects, which are not mentioned above, will be apparently appreciated by a person having ordinary skill in the art from the following description.

Technical Solution

According to an embodiment of the present disclosure, a method for transmitting, by a terminal, a random access preamble in a wireless communication system supporting a narrowband-Internet of things (NB-IoT) includes: receiving, from a base station, first configuration information for a first random access preamble and second configuration information for a second random access preamble; transmitting, to the base station, the first random access preamble by using the first configuration information; and transmitting, to the base station, the second random access preamble based on the second configuration information, when transmission of the first random access preamble satisfies a predetermined criterion, in which any one of the first random access preamble and the second random access preamble is generated based on a sequence in which all elements are not configured to 1.

In the method according to the embodiment of the present disclosure, the predetermined criterion may be configured based on a retransmission number for the transmission of the first random access preamble.

In the method according to the embodiment of the present disclosure, information on a specific retransmission number of the first random access preamble may be included in the first configuration information, and the second random access preamble may be transmitted after the first random access preamble is retransmitted by the specific retransmission number.

In the method according to the embodiment of the present disclosure, the first random access preamble may be power-ramped by the specific retransmission number and is transmitted by the specific retransmission number, and the second random access preamble may be transmitted with transmission power which is power-ramped by the specific retransmission number.

In the method according to the embodiment of the present disclosure, the first random access preamble may be power-ramped by the specific retransmission number and is transmitted by the specific retransmission number, and the second random access preamble may be transmitted with predetermined initial transmission power.

In the method according to the embodiment of the present disclosure, the specific retransmission number may be a maximum attempt number predetermined for the transmission of the first random access preamble.

In the method according to the embodiment of the present disclosure, a resource allocation region represented by the first configuration information may not overlap with the resource allocation region represented by the second configuration information.

In the method according to the embodiment of the present disclosure, the second configuration information may be configured as a subset of the first configuration information.

In the method according to the embodiment of the present disclosure, the first random access preamble may be scrambled with a sequence in which all elements are configured to 1 and generated, the second random access preamble may be scrambled with a sequence in which all elements are not configured to 1 and generated, and the first random access preamble may be configured as a default random access preamble.

The method according to the embodiment of the present disclosure may further include receiving, from the base station, preamble support configuration information indicating whether the base station supports the first random access preamble and the second random access preamble.

In the method according to the embodiment of the present disclosure, the preamble support configuration information may further include information representing a preamble to be used in a random access procedure by the terminal.

According to an embodiment of the present disclosure, a terminal transmitting a random access preamble in a wireless communication system supporting a narrowband-Internet of things (NB-IoT) includes: a Radio Frequency (RF) unit for transmitting and receiving a radio signal; and a processor functionally connected to the RF unit, in which the processor is configured to receive, from a base station, first configuration information for a first random access preamble and second configuration information for a second random access preamble transmit, to the base station, the first random access preamble by using the first configuration information; and transmit, to the base station, the second random access preamble based on the second configuration information, when transmission of the first random access preamble satisfies a predetermined criterion, and in which any one of the first random access preamble and the second random access preamble is generated based on a sequence in which all elements are not configured to 1.

In the terminal according to the embodiment of the present disclosure, the predetermined criterion may be configured based on a retransmission number for the transmission of the first random access preamble.

In the terminal according to the embodiment of the present disclosure, information on a specific retransmission number of the first random access preamble may be included in the first configuration information, and the second random access preamble may be transmitted after the first random access preamble is retransmitted by the specific retransmission number.

Advantageous Effects

According to an embodiment of the present disclosure, a load balancing effect may be obtained by using two or more types of preambles instead of using only one preamble for a random access procedure, thereby optimizing performance of a base station and/or a terminal and a random access procedure.

Advantages which can be obtained in the present disclosure are not limited to the aforementioned effects and other unmentioned advantages will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

FIG. 8 illustrates examples of a PRACH signal to which a method proposed in this specification may be applied.

MODE FOR INVENTION

Figure 1:
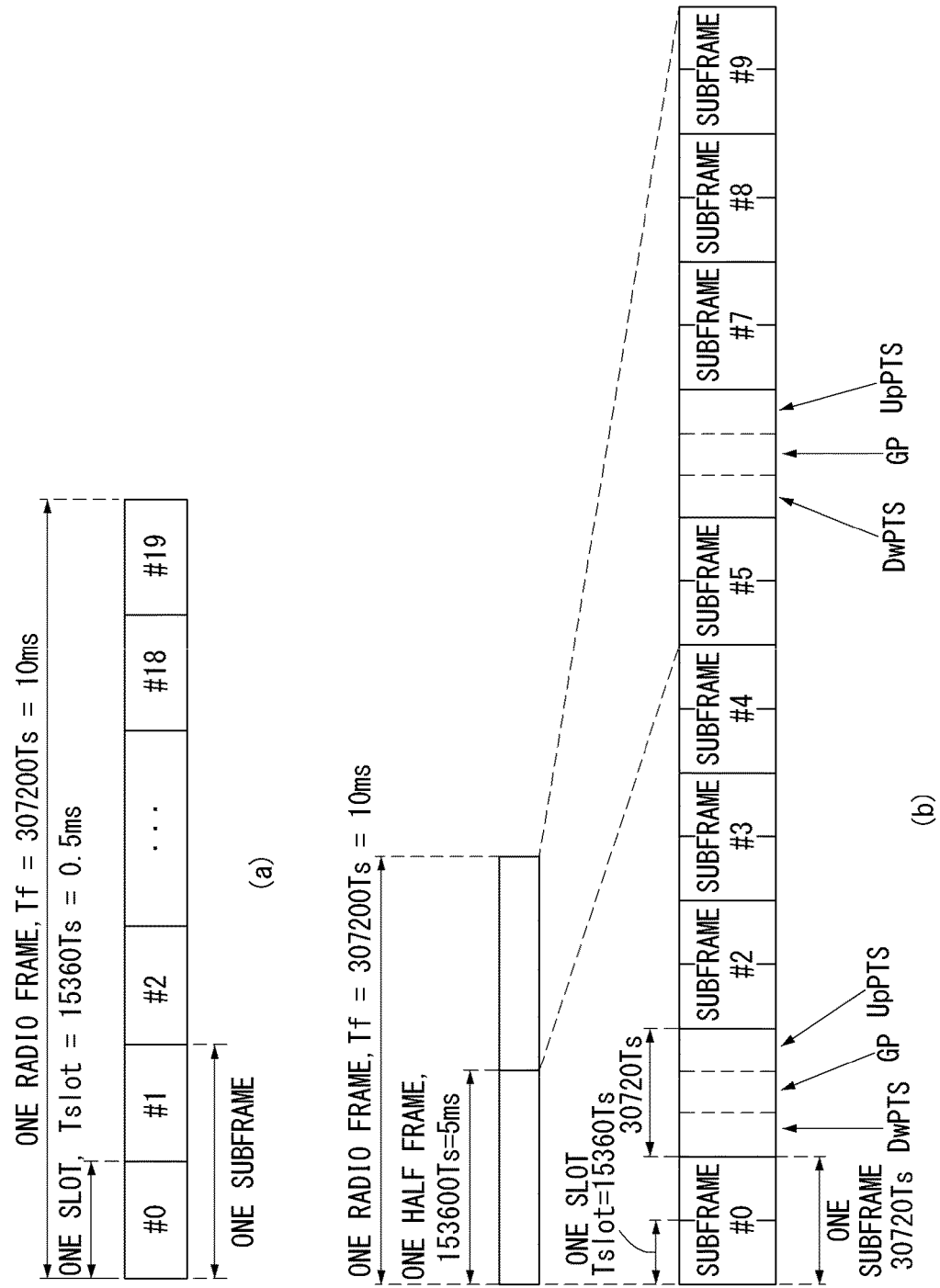
FIG. 1 illustrates a structure of a radio frame in a wireless communication system to which the present disclosure can be applied.

Hereinafter, preferred embodiments of the present disclosure will be described in detail with reference to the accompanying drawings. The detailed description, which will be given below with reference to the accompanying drawings, is intended to explain exemplary embodiments of the present disclosure and is not intended to represent the only embodiments in which the present disclosure may be practiced. The following detailed description includes specific details in order to provide a thorough understanding of the present disclosure. However, those skilled in the art appreciate that the present disclosure may be practiced without these specific details.

In some instances, well-known structures and devices may be omitted or shown in a block diagram form centering on the core functions of the structures and devices in order to avoid obscuring the concepts of the present disclosure.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal.

Specific terms used in the following description are provided to help the understanding of the present disclosure, and the use of the specific terms may be changed to other forms without departing from the technical spirit of the present disclosure.

The following technology may be used for various multiple access schemes which include code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), and the like. The CDMA may be implemented as radio technology such as universal terrestrial radio access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802, Evolved UTRA (E-UTRA), or the like. The UTRA is part of Universal Mobile Telecommunications System (UMTS). 3rd Generation Partnership Project (3GPP) Long Term Evolution (LTE) as a part of Evolved UMTS (E-UMTS) using the E-UTRA adopts OFDMA in downlink and adopts SC-FDMA in uplink. LTE-A (Advanced) is evolution of LTE.

Embodiments of the present disclosure may be supported by standard documents disclosed in at least one of wireless access systems IEEE 802, 3GPP, and 3GPP2. That is, steps or portions of the embodiments of the present disclosure which are not described in order to clearly illustrate the technical spirit of the present disclosure may be supported by the documents. Further, all terms disclosed in the document may be described by the standard document.

For clarity of description, 3GPP LTE/LTE-A is mainly described, but the technical features of the present disclosure are not limited thereto.

Overview of System

FIG. 1 illustrates a structure of a radio frame in a wireless communication system to which the present disclosure can be applied.

A 3GPP LTE/LTE-A supports radio frame structure type 1 applicable to frequency division duplex (FDD) and radio frame structure type 2 applicable to time division duplex (TDD).

In FIG. 1, the size of the radio frame in the time domain is represented by a multiple of a time unit of $T\_s=1/(15000*2048)$. The downlink and uplink transmissions are configured by a radio frame having an interval of $T\_f=307200*T\_s=10$ ms.

FIG. 1(a) above illustrates the structure of radio frame type 1. Radio frame type 1 may be applied to both full duplex and half duplex FDDs.

The radio frame is constituted by 10 subframes. One radio frame is constituted by 20 slots having a length of $T\_slot=15360*T\_s=0.5$ ms and indexes of 0 to 19 are granted to each slot. One subframe is constituted by two consecutive slots in the time domain and subframe i is constituted by slot 2i and slot 2i+1. A time required for transmitting one subframe is referred to as a transmission time interval (TTI). For example, a length of one subframe may be 1 ms and the length of one slot may be 0.5 ms.

In the FDD, the uplink transmission and the downlink transmission are classified in the frequency domain. There is no limit in the full duplex FDD, while in a half duplex FDD operation, the UE may not perform transmission and reception simultaneously.

One slot includes a plurality of orthogonal frequency division multiplexing (OFDM) symbols in the time domain and includes multiple resource blocks (RBs) in the frequency domain. Since the 3GPP LTE uses OFDMA in the downlink, the OFDM symbol is intended to represent one symbol period. The OFDM symbol may be referred to as one SC-FDMA symbol or symbol period. A resource block as a resource allocation unit includes a plurality of consecutive subcarriers in one slot.

FIG. 1(b) illustrates frame structure type 2. Radio frame type 2 is constituted by two half frames each having a length of $153600*T\_s=5$ ms. Each half frame is constituted by 5 subframes having a length of $30720*T\_s=1$ ms.

In frame structure type 2 of the TDD system, an uplink-downlink configuration is a rule indicating whether the uplink and the downlink are assigned (or reserved) for all subframes. Table 1 shows an uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of the radio frame, 'D' denotes a subframe for the downlink transmission, 'U' denotes a subframe for the uplink transmission, 'S' denotes a special subframe constituted by three fields, i.e., a downlink pilot time slot (DwPTS), a guard period (GP), and an uplink pilot time slot (UpPTS).

The DwPTS is used for initial cell search, synchronization, or channel estimation in the UE. The UpPTS is used to match the channel estimation at the base station and uplink transmission synchronization of the UE. The GP is a period for eliminating interference caused in the uplink due to a multi-path delay of a downlink signal between the uplink and the downlink.

Each subframe i is constituted by slot 2i and slot 2i+1 each having a length of $T\_slot=15360*T\_s=0.5$ ms.

The uplink-downlink configuration may be divided into 7 types and locations and/or the numbers of downlink subframes, special subframes, and uplink subframes vary for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-uplink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 2 shows a configuration (the length of DwPTS/GP/UpPTS) of the special subframe.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is merely an example and the number of subcarriers included in the radio frame or the number of slots included in the subframe, and the number of OFDM symbols included in the slot may be variously changed.

Figure 2:
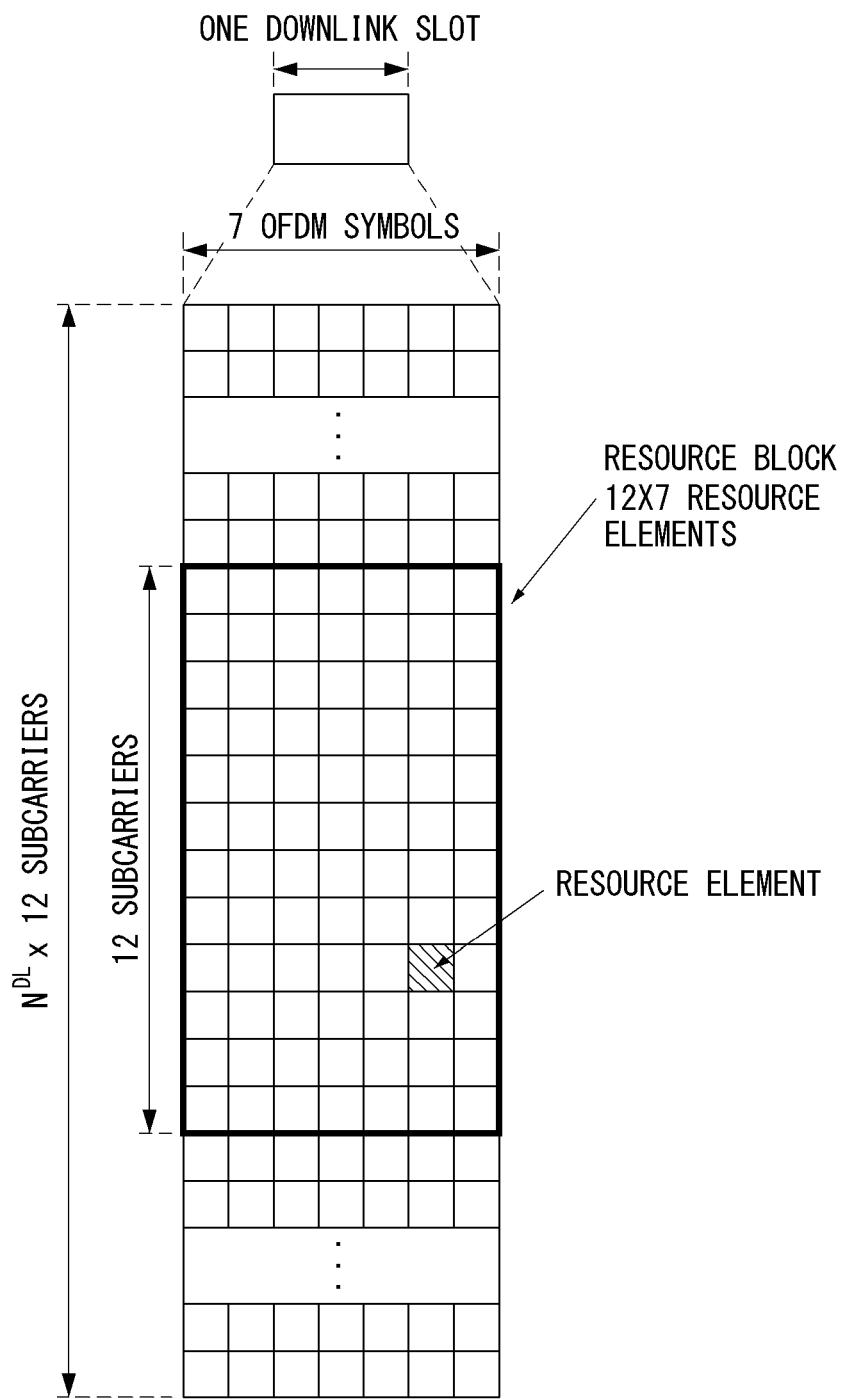
FIG. 2 is a diagram exemplifying a resource grid for one downlink slot in a wireless communication system to which the present disclosure may be applied.

FIG. 2 is a diagram exemplifying a resource grid for one downlink slot in a wireless communication system to which the present disclosure may be applied.

Referring to FIG. 2 above, one downlink slot includes the plurality of OFDM symbols in the time domain. Here, it is exemplarily described that one downlink slot includes 7 OFDM symbols, and one resource block includes 12 subcarriers in the frequency domain, but the present disclosure is not limited thereto.

Each element on the resource grid is referred to as a resource element (RE) and one resource block (RB) includes 12×7 resource elements. The number $N^{DL}$ of resource blocks included in the downlink slot depends on a downlink transmission bandwidth.

The structure of the uplink slot may be the same as the structure of the downlink slot.

Figure 3:
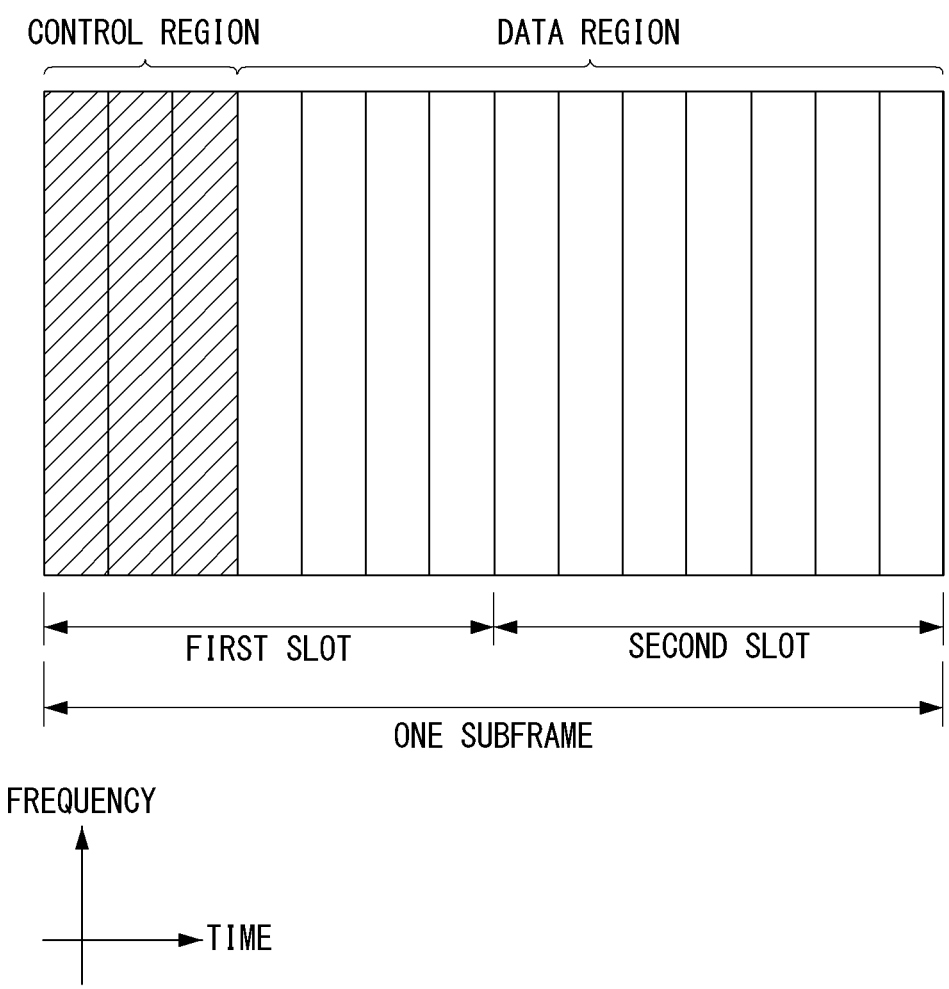
FIG. 3 illustrates an architecture of a downlink subframe in a wireless communication system to which the present disclosure may be applied.

FIG. 3 illustrates an architecture of a downlink subframe in a wireless communication system to which the present disclosure may be applied.

Referring to FIG. 3, a maximum of first three OFDM symbols in a first slot in the subframe are control regions in which control channels are allocated and the remaining OFDM symbols are data regions in which Physical Downlink Shared Channels (PDSCHs) are allocated. An example of a downlink control channel used in 3GPP LTE includes a physical control format indicator channel (PCFICH), a physical downlink control channel (PDCCH), a physical hybrid-ARQ indicator channel (PHICH), and the like.

The PCFICH is transmitted in the first OFDM symbol of the subframe and carries information on the number (i.e., a size of the control region) of OFDM symbols used for transmission of the control channels in the subframe. The PHICH is a response channel to the uplink and carries an Acknowledgement (ACK)/Not-Acknowledgement (NACK) signal for the Hybrid Automatic Repeat Request (HARQ). Control information transmitted through the PDCCH is referred to as downlink control information (DCI). The downlink control information includes uplink resource allocation information, downlink resource allocation information, or an uplink transmission (Tx) power control command for an arbitrary UE group.

The PDCCH may carry resource allocation and a transmission format (also referred to as a downlink (DL) grant) of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. A plurality of PDCCHs may be transmitted in the control region and the UE may monitor the plurality of PDCCHs. The PDCCH is configured by one control channel element or a set of a plurality of consecutive control channel elements (CCEs). The CCE is a logical allocation unit used for providing a coding rate depending on a state of a radio channel to the PDCCH. The CCE corresponds to a plurality of resource element groups. A format of the PDCCH and the number of bits of the PDCCH available are determined according to an association relationship between the number of CCEs and the coding rate provided by the CCEs.

The eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for a specific UE. Alternativley, in the case of the PDCCH for the paging message, the CRC may be masked with a paging indication identifier identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

The enhanced PDCCH (EPDCCH) carries UE-specific signaling. The EPDCCH is located in a physical resource block (PRB) that is configured to be UE specific. In other words, as described above, the PDCCH may be transmitted in up to three OFDM symbols in the first slot in the subframe, but the EPDCCH can be transmitted in a resource region other than the PDCCH. The time (i.e., symbol) at which the EPDCCH starts in the subframe may be configured in the UE via higher layer signaling (e.g., RRC signaling, etc.).

The EPDCCH may carry a transport format, resource allocation, and HARQ information associated with DL-SCH, a transport format, resource allocation, and HARQ information associated with UL-SCH, resource allocation information associated with Sidelink Shared Channel (SL-SCH) and Physical Sidelink Control Channel (PSCCH), etc. Multiple EPDCCHs may be supported and the UE may monitor the set of EPCCHs.

The EPDCCH may be transmitted using one or more successive enhanced CCEs (ECCEs) and the number of ECCEs per EPDCCH may be determined for each EPDCCH format.

Each ECCE may be constituted by a plurality of enhanced resource element groups (EREGs). The EREG is used for defining mapping of the ECCE to the RE. There are 16 EREGs per PRB pair. All REs are numbered from 0 to 15 in the order in which the next time increases in the order in which the frequency increases, except for the RE carrying the DMRS in each PRB pair.

The UE may monitor a plurality of EPDCCHs. For example, one or two EPDCCH sets may be configured in one PRB pair in which the UE monitors EPDCCH transmission.

Different coding rates may be implemented for the EPCCH by merging different numbers of ECCEs. The EPCCH may use localized transmission or distributed transmission, and as a result, the mapping of the ECCE to the RE in the PRB may vary.

Figure 4:
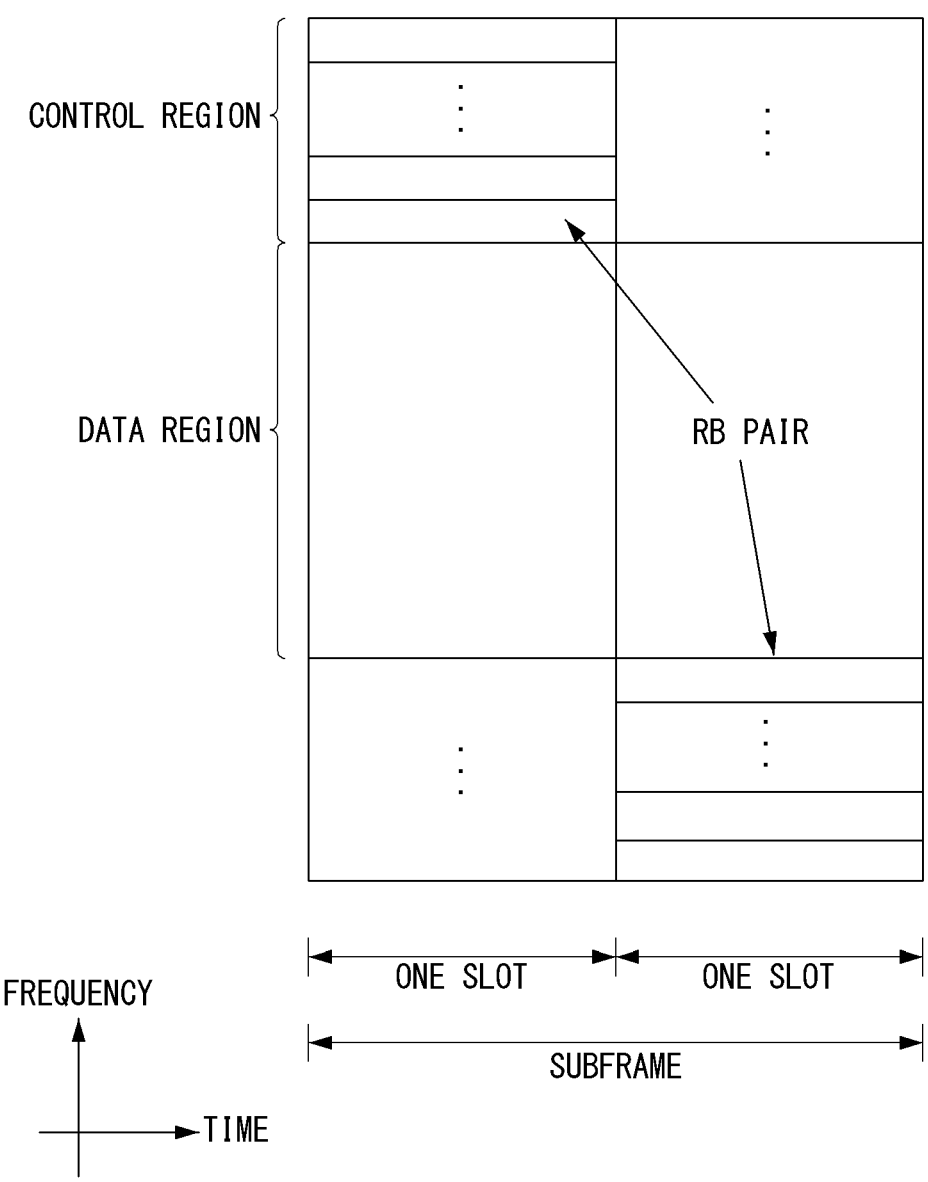
FIG. 4 illustrates a structure of an uplink subframe in a wireless communication system to which the present disclosure can be applied.

FIG. 4 illustrates a structure of an uplink subframe in a wireless communication system to which the present disclosure can be applied.

Referring to FIG. 4, the uplink subframe may be divided into the control region and the data region in the frequency domain. The physical uplink control channel (PUCCH) carrying the uplink control information is allocated to the control region. A physical uplink shared channel (PUSCH) carrying the user data is allocated to the data region. In order to maintain a single carrier characteristic, one UE does not transmit the PUCCH and the PUSCH at the same time.

A resource block (RB) pair within the subframe is allocated to the PUCCH for one UE. RBs belonging to the RB pair occupy different subcarriers in each of two slots. In this case, the RB pair allocated to the PUCCH frequency-hops in a slot boundary.

Overview of Carrier Aggregation

A communication environment considered in embodiments of the present disclosure includes all multi-carrier support environments. That is, a multi-carrier system or carrier aggregation (CA) system used in the present disclosure is a system in which, when a target wide band is configured, one or more component carriers (CCs) having a bandwidth smaller than a target bandwidth are aggregated and used in order to support a wide band.

In the present disclosure, multi-carriers refer to aggregation (or carrier aggregation) of carriers and in this case, the aggregation of the carriers refers to both aggregation of contiguous carriers and aggregation of non-contiguous carriers. Further, the number of components carriers aggregated between the downlink and the uplink may be set differently. A case where the number of downlink component carriers (hereinafter, referred to as 'DL CC') is equal to the number of uplink component carriers (hereinafter, referred to as 'UL CC') is referred to as symmetric aggregation and a case where the number of downlink CCs is different from the number of uplink CCs is referred to as asymmetric aggregation. Such carrier aggregation may be used interchangeably with terms such as carrier aggregation, bandwidth aggregation, spectrum aggregation, and the like.

Carrier aggregation configured by combining two or more component carriers aims at supporting up to 100 MHz bandwidth in the LTE-A system. When one or more carriers having a bandwidth smaller than the target bandwidth are combined, the bandwidth of the combined carriers may be limited to the bandwidth used in the existing system in order to maintain backward compatibility with the existing IMT system. For example, in the existing 3GPP LTE system, {1.4, 3, 5, 10, 15, 20} MHz bandwidth is supported and in 3GPP LTE-advanced system (that is, LTE-A), a bandwidth larger than 20 MHz may be supported by using only the bandwidths for compatibility with the existing system. Further, the carrier aggregation system used in the present disclosure may support the carrier aggregation by defining a new bandwidth regardless of the bandwidth used in the existing system.

The LTE-A system uses a concept of a cell to manage radio resources.

The aforementioned carrier aggregation environment may be referred to as a multiple-cell environment. The cell is defined as a combination of a pair of a downlink resource (DL CC) and an uplink resource (UL CC), but the uplink resource is not required. Accordingly, the cell may be constituted by the downlink resource along or by the downlink resource and the uplink resource. When a specific user equipment has only one configured serving cell, the specific user equipment may have one DL CC and one UL CC, but when the specific user equipment has two or more configured serving cells, the specific user equipment may have DL CCs as many as the cells and the number of UL CCs may be equal to or smaller therethan.

Alternatively, on the contrary, the DL CC and the UL CC may be configured. That is, when the specific user equipment has multiple configured serving cells, a carrier aggregation environment in which the number of UL CCs is larger than the number of DL CCs may also be supported. That is, the carrier aggregation may be appreciated as aggregation of two or more different cells having carrier frequencies (center frequency of the cell), respectively. Here, the term 'cell' needs to be distinguished from a 'cell' as an area covered by the eNB which is generally used.

The cell used in the LTE-A system includes a primary cell (PCell) and a secondary cell (SCell). The P cell and the S cell may be used as the serving cell. In the case of a user equipment which is in an RRC_CONNECTED state, but does not configure the carrier aggregation or does not support the carrier aggregation, only one serving cell configured only by the P cell exists. On the contrary, in the case of a user equipment which is in the RRC_CONNECTED state and configures the carrier aggregation, one or more serving cells may exist and the entire serving cell includes the P cell and one or more S cells.

The serving cell (P cell and S cell) may be configured through an RRC parameter. PhysCellId has integer values of 0 to 503 as a physical layer identifier of the cell. SCellIndex has integer values of 1 to 7 as a short identifier used for identifying the S cell. ServCellIndex has integer values of 0 to 7 as a short identifier used for identifying the serving cell (P cell or S cell). The 0 value is applied to the P cell and SCellIndex is previously granted to be applied to the S cell. That is, a cell having the smallest cell ID (or cell index) in ServCellIndex becomes the P cell.

The P cell refers to a cell operating on a primary frequency (or primary CC). The user equipment may be used to perform an initial connection establishment process or a connection re-establishment process and may refer to a cell indicated during a handover process. Further, the P cell refers to a cell which becomes a center of control related communication among the serving cells configured in the carrier aggregation environment. That is, the user equipment may be allocated the PUCCH only in the P cell thereof and may transmit the allocated PUCCH and may use only the P cell for acquiring system information or changing a monitoring procedure. Evolved Universal Terrestrial Radio Access (E-UTRAN) may change only the P cell for the handover procedure by using an RRC connection reconfiguration message of a higher layer, which includes mobility control information to the user equipment that supports the carrier aggregation environment.

The S cell refers to a cell operating on a second frequency (or secondary CC). Only one P cell may be allocated to the specific user equipment and one or more S cells may be allocated to the specific user equipment. The S cell may be configured after the RRC connection is configured and may be used to provide an additional radio resource. The PUCCH does not exist in remaining cells other than the P cell among the serving cells configured in the carrier aggregation environment, that is, the S cell. When the E-UTRAN adds the S cell to the user equipment supporting the carrier aggregation environment, the E-UTRAN may provide all the system information related to the operation of a related cell which is in the RRC_CONNECTED state through a dedicated signal. The change of the system information may be controlled by releasing and adding the related S cell and the RR connection reconfiguration message of the higher layer may be used at this time. The E-UTRAN may perform dedicated signaling with different parameters for each user equipment rather than broadcasting within the related S cell.

After an initial security activation process starts, the E-UTRAN may configure a network including one or more S cells in addition to the P cell initially configured in the connection configuration process. In the carrier aggregation environment, the P cell and the S cell may operate as respective component carriers. In the following embodiments, the primary component carrier (PCC) may be used in the same meaning as the P cell and the secondary component carrier (SCC) may be used in the same meaning as the S cell.

Figure 5:
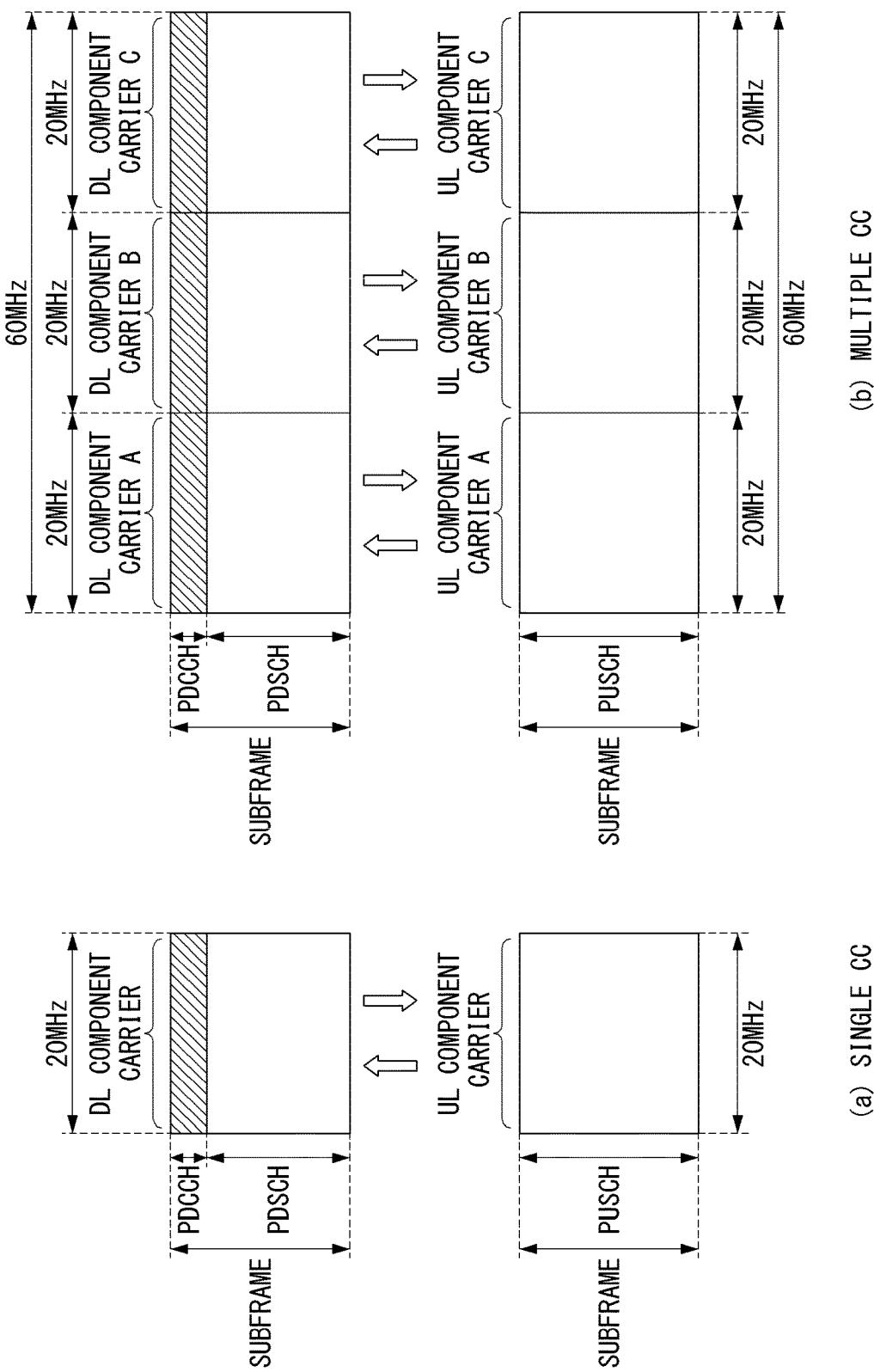
FIG. 5 illustrates examples of a component carrier and carrier aggregation in a wireless communication system to which the present disclosure may be applied.

FIG. 5 illustrates examples of a component carrier and carrier aggregation in a wireless communication system to which the present disclosure may be applied.

FIG. 5(a) illustrates a single carrier structure used in the LTE system. The component carrier includes the DL CC and the UL CC. One component carrier may have a frequency range of 20 MHz.

FIG. 5(b) illustrates a carrier aggregation structure used in the LTE-A system. FIG. 5(b) illustrates a case where three component carriers having a frequency magnitude of 20 MHz are combined. There are three DL CCs and three UL CCs, but the numbers of DL CCs and UL CCs are not limited. In the case of the carrier aggregation, the UE may simultaneously monitor three CCs, and receive a downlink signal/data and transmit an uplink signal/data.

When N DL CCs are managed in a specific cell, the network may allocate M (M≤N) DL CCs to the user equipment. In this case, the UE may monitor only M limited DL CCs and receive the DL signal. Further, the network may allocate a primary DL CC to the user equipment by assigning priorities to L (L≤M≤N) DL CCs and in this case, the UE needs to particularly monitor L DL CCs. Such a scheme may be similarly applied even to uplink transmission.

A linkage between the carrier frequency (or DL CC) of the downlink resource and the carrier frequency (or UL CC) of the uplink resource may be indicated by a higher layer message such as an RRC message or system information. For example, a combination of the DL resource and the UL resource may be configured by a linkage defined by System Information Block Type2 (SIB2). Specifically, the linkage may refer to a mapping relationship between a DL CC in which a PDCCH carrying a UL grant is transmitted and a UL CC that uses the UL grant or may refer to a mapping relationship between a DL CC (or UL CC) in which data for HARQ is transmitted and a UL CC (or DL CC) in which an HARQ ACK/NACK signal is transmitted.

Figure 6:
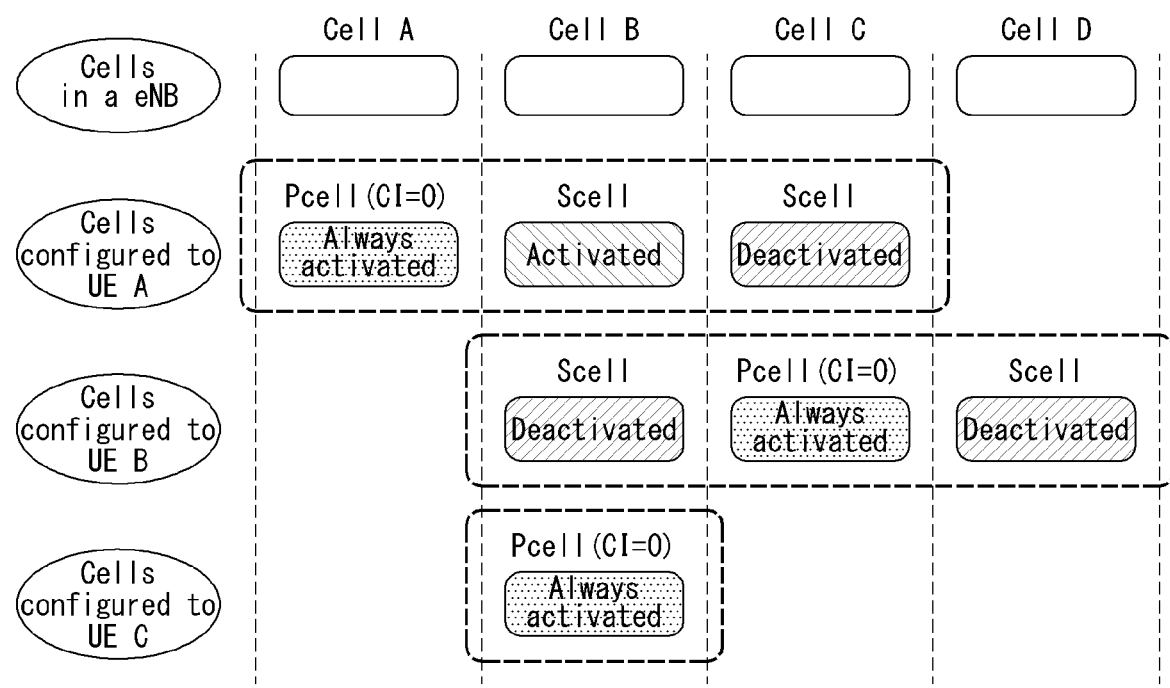
FIG. 6 is a diagram illustrating division of cells of a system supporting carrier aggregation.

FIG. 6 is a diagram illustrating division of cells of a system supporting carrier aggregation.

Referring to FIG. 6, a configured cell may be configured for each UE as a cell capable of aggregating carriers based on a measurement report among cells of the eNB as illustrated in FIG. 5. The configured cell may reserve resources for ack/nack transmission in advance for PDSCH transmission. The activated cell is a cell configured to actually transmit PDSCH/PUSCH among the configured cells and performs channel state information (CSI) reporting and sounding reference signal (SRS) transmission for PDSCH/PUSCH transmission. The de-activated cell is a cell that prevents the PDSCH/PUSCH transmission by a command or timer operation of the eNB, and may also stop the CSI reporting and the SRS transmission.

Single-Tone PRACH Transmission for NB-IoT

First, contents related to the design of the PRACH symbol of the basic unit will be described.

Basically, a random access channel (hereinafter, referred to as a Physical Random Access Channel (PRACH)) transmitted in a single-tone may be transmitted at locations on multiple frequency domains. By using the random access channel, an eNB end may estimate an arrival time.

For example, assuming a PRACH signal x(t), when the UE transmits an X[0] value at f1 in a first time interval and an X[1] value at f2 in a second time interval, the eNB may measure the arrival time by using a pre-measured frequency offset between f1 and f2.

When a reciprocal number of the subcarrier spacing is expressed in T, the arrival time is expressed in $\Delta t$ and the frequency offset is expressed in $\Delta f$, a value corresponding to f1 is 'X[0] *exp $(-j2\pi\{f1+\Delta f\}/T\} \Delta t)$' and a value corresponding to f2 is 'X[1] *exp $(-j2\pi \{f2+\Delta f\}/T\} \Delta t)$'.

'X[0] *X[1] *exp$(-j2\pi\{f2-f1\}/T\} \Delta t)$' may be derived through a conjugate product on values between two REs and the arrival time may be calculated from the equation. However, a range in which the arrival time may be measured may be limited to the maximum T.

In consideration of a channel environment and the like, PRACH signal transmission in two time intervals may be extended to multiple time intervals (e.g., 100 intervals). In addition, the number of frequency intervals may be set to a large number, and may be limited to two in consideration of overhead.

Figure 7:
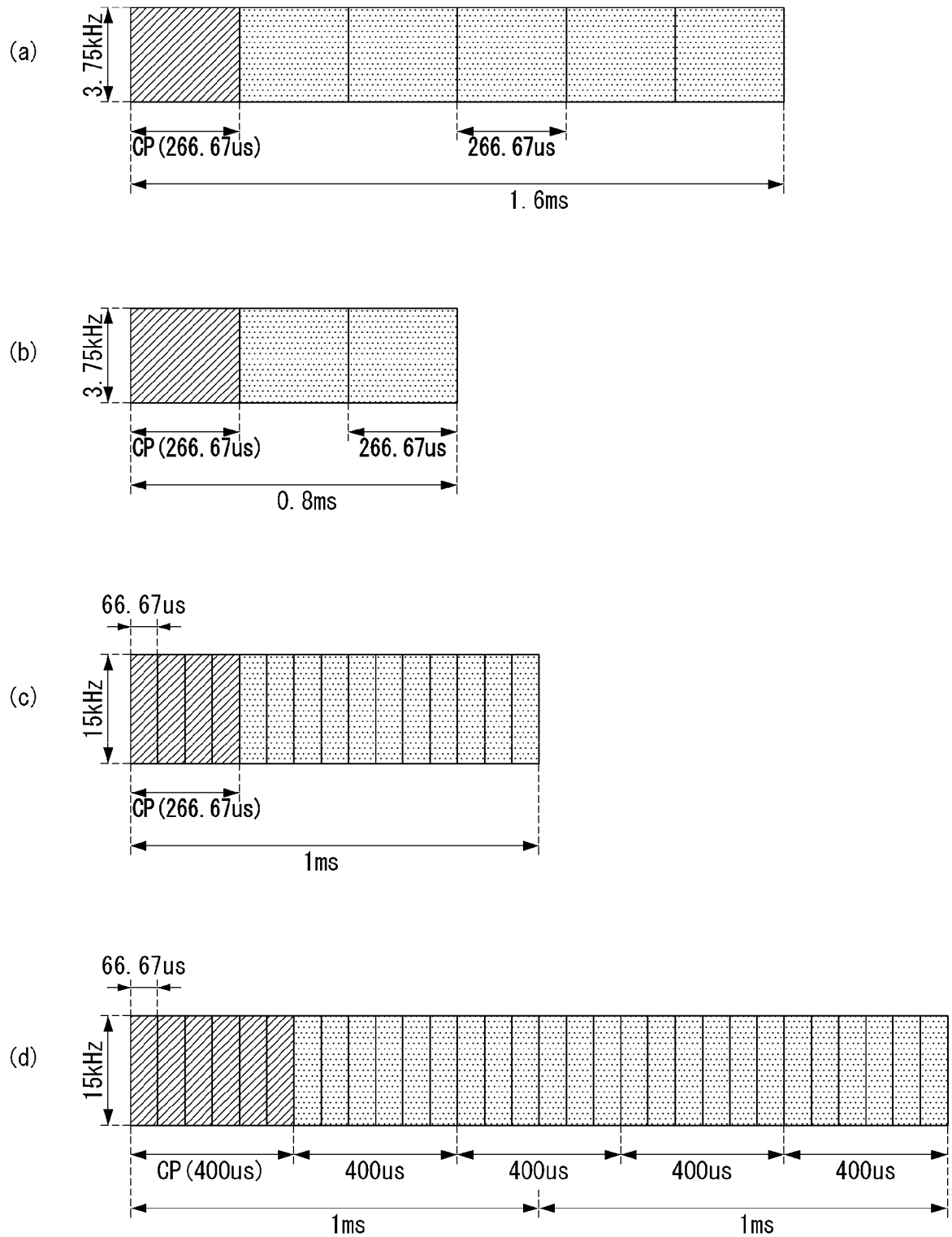
FIG. 7 illustrates examples of a PRACH unit to which a method proposed in this specification may be applied.

A time interval for continuously transmitting a PRACH signal for the same frequency resource may be referred to as a PRACH symbol and the PRACH signal transmitted in the corresponding region may be referred to as a PRACH signal unit, a PRACH unit, or a preamble. FIG. 7 illustrates examples of a PRACH unit.

FIG. 7 illustrates examples of a PRACH unit to which a method proposed in this specification may be applied. FIG. 7 is just for convenience of the description and does not limit the scope of the present disclosure.

FIG. 7(a) illustrates an example of a case where the subcarrier spacing is 3.75 kHz and the PRACH unit is constituted by six sub-symbols. In this case, one sub-symbol may be used as a cyclic prefix (CP). Specifically, it is possible to sufficiently cover a case where the length of the CP is 266.67 us and a radius of a target cell is 35 km.

In this case, the number of sub-symbols constituting the PRACH unit may be differently configured. FIG. 7(b) illustrates an example of a case where the subcarrier spacing is 3.75 kHz and the PRACH unit is constituted by three sub-symbols. In this case, the length of the PRACH unit is 0.8 ms.

FIG. 7(c) illustrates an example of a case where the subcarrier spacing is 15 kHz and the PRACH unit is constituted by 15 sub-symbols. In this case, four sub-symbols may be used as the CP. Specifically, the length of the CP is 266.67 us, and the radius of the target cell may be supported according to a mapping value for each sub-symbol. The number of sub-symbols constituting the PRACH unit may be differently configured and the length of the PRACH unit may be 0.8 ms when the number of sub-symbols is 12 and 1.6 ms when the number of sub-symbols is 24.

FIG. 7(d) illustrates an example of a case where the subcarrier spacing is 15 kHz and the PRACH unit is constituted by 30 sub-symbols. In this case, six sub-symbols may be used as the CP. Specifically, the length of the CP is 400 us, and the radius of the target cell may be supported according to a mapping value for each sub-symbol. The number of sub-symbols constituting the PRACH unit may be differently configured and the length of the PRACH unit may be 0.8 ms when the number of sub-symbols is 12 and 1.6 ms when the number of sub-symbols is 24.

In the PRACH unit, a value mapped to each sub-symbol may be similarly configured by considering a peak to average power ratio (PAPR) and a value mapped per unit may be different.

In the case of the PRACH signal configured by collecting the units, values transmitted for each unit may be expressed in a sequence form. For example, when the PRACH signal is constituted by 100 units, one value (i.e., a value corresponding to one element) of a sequence having a length of 100 may be configured to be transmitted to each unit.

The location on the frequency domain in which the corresponding unit is transmitted at each time may be changed and two or more regions may be hopped (i.e., frequency hopped) with a specific pattern.

Next, a mapping method of data and/or a sequence in the unit (i.e., PRACH unit) of the PRACH unit will be described.

When the subcarrier spacing is not configured to be sufficiently smaller than the radius of the target cell, a scheme in which the same value is mapped all sub-symbols in the same PRACH unit may not be suitable as a measurable and distinguishable arrival time is limited.

When such a point is considered, a method for designing the value or sequence mapped to the sub-symbol differently from the existing method needs to be considered. In other words, while in an existing sequence (hereinafter, referred to as a legacy sequence), values of all elements are configured to 1, in a newly designed sequence (hereinafter, referred to as a new sequence), the values of all elements may not be configured to 1, but may be configured by a combination of various values.

Hereinafter, a method for designing a new sequence will be described.

Basically, in case of the NB-IoT UE, it is necessary to adjust the PAPR as low as possible in consideration of complexity. Therefore, it may be advantageous that the degree of change of the sub-symbol value within the PRACH signal unit is kept small.

Specific examples of a method for mapping the value to the sub-symbol in the PRACH signal unit are as follows. In the method described below, Nseq means the number of sub-symbols in the PRACH unit, Ncp means the number of sub-symbols for the CP,1 and M means the number of PRACH units constituting the PRACH signal.

For example, a method (method 1) for generating a sequence having a length of (Nseq−Ncp)*M may be considered. Here, the sequence may be a Zha-doff Chu sequence (ZC sequence).

In the case of the Zadoff-Chu sequence, after the sequence is generated longer than (Nseq−Ncp)*M to adjust the length of the sequence to a prime number, a part of the generated sequence may be cut. Alternatively, after the sequence is generated shorter than (Nseq−Ncp)*M, the generated sequence may be circularly repeated.

In this case, multiple sequences may be generated using multiple root indexes, or multiple sequences may be generated using multiple cyclic shifts within the same index.

Alternatively, the sequence having the length of (Nseq−Ncp)*M' may be generated based on M' smaller than the number of PRACH units. Here, M' may be a predetermined value or a value indicated through the higher layer signaling (e.g., a system information block (SIB)).

As another example, a method (method 2) for generating a sequence having a length of Nseq*M may be considered. Here, the sequence may be a sequence for the purpose of the Discrete Frequency Transform (DFT).

In the case of the DFT sequence, the sequence may be expressed in a form of exp(j2pi*k*p/((Nseq−Ncp)*M)). Here, k is 0, 1, or (Nseq−Ncp)*M−1. At this time, in order to generate an additional sequence, the value of p may be adjusted, and the value of p may be limited in consideration of the PAPR.

As yet another example, a method (method 3) for generating a sequence having a length of (Nseq−Ncp) for each PRACH unit may also be considered. Here, the sequence may be the ZC sequence or the DFT sequence.

In this case, the sequence mapped to each PRACH unit may be configured identically or differently for all PRACH units. Considering the improvement and complexity of autocorrelation performance, a case where multiple sequences are generated may also be considered. As an example, a first sequence may be used for a first tone and a second sequence may be used for a second tone.

FIG. 8 illustrates examples of a PRACH signal to which a method proposed in this specification may be applied. FIG. 8 is just for convenience of the description and does not limit the scope of the present disclosure.

Referring to FIG. 8(a), it is assumed that the sequence for the PRACH signal is generated using Method 1 described above. In this case, the generated single sequence may be divided and distributed to each PRACH unit.

Unlike this, referring to FIG. 8(b), it is assumed that the sequence for the PRACH signal is generated using Method 3 described above. In this case, each generated sequence may be distributed to each PRACH unit.

In the above-described examples, the sub-symbol of each PRACH unit may be constituted by the sequence having the length of (Nseq−Ncp) and a CP generated by copying a last Ncp of the sequence. Further, the examples, other types of sequences other than the ZC sequence and the DFT sequence may be applied.

When there are multiple sequences configured for transmission of the PRACH constituted by multiple PRACH units, an orthogonal cover code (OCC) may be applied for an increase of a multiplexing capability using code division multiplexing (CDM).

For example, when the number of PRACH units is M, a method for generating an OCC having a length of M and multiplying the OCC configuration value by each unit by a symbol value of each PRACH unit may be considered. Alternatively, a method for generating M/M' OCCs having the M' length smaller than M and applying the OCC having the M' length in units of M' units to the symbol value of the PRACH unit may also be considered.

In this case, the eNB may CDM and/or distinguish multiple PRACHs by using the combination of the sequence and the OCC. Specifically, a root index, a cyclic shift, and/or the OCC for the sequence may be changed for the CDM. When the new sequence is constituted by multiple ZC sequences, a cyclic shift value for each ZC sequence may be differently configured.

When the values mapped the same PRACH unit are the same, it may be necessary to generate a sequence having a length of M in terms of the overall PRACH signal. In this case, the sequence may be generated based on the ZC sequence, the DFT sequence, or a third sequence.

As described above, Narrowband (NB)-LTE refers to a system for supporting low complexity and low power consumption with a system bandwidth (system BW) corresponding to 1 Physical Resource Block (PRB) of LTE system.

That is, the NB-LTE system may be primarily used as a communication mode for implementing the internet of things (IoT) by supporting a device (or UE) such as machine-type communication (MTC) in a cellular system. That is, the NB-LTE system may also be referred to as NB-IoT.

Further, the NB-IoT system does not need to allocate an additional band for the NB-IoT system by using the same OFDM parameters such as the subcarrier spacing used in the existing LTE system, as the LTE system. In this case, 1 PRB of the legacy LTE system band is allocated for the NB-IoT, which is advantageous in using the frequency efficiently.

The physical channel of the NB-IoT system may be defined as N-Primary Synchronization Signal (N-PSS), N-Secondary Synchronization Signal (N-SSS), N-Physical Channel (N-PBCH), N-PDCCH/N-EPDCCH, N-PDSCH, or the like in the case of downlink. Here, 'N-' may be used for distinguishing from the legacy LTE.

In the case of the NB-IoT system, the UE may transmit NPRACH (N-PRACH) in a single-tone transmission scheme.

Hereinafter, this specification proposes a method for configuring a preamble (i.e., a preamble considering a new sequence) which may be newly introduced when NPRACH is transmitted in a single-tone transmission scheme and operating methods of the eNB and the UE related thereto.

The embodiment described in this specification may be applied to another channel other than the PRACH and may be applied to not the single-tone transmission scheme but the multi-tone transmission scheme.

Method for Configuring Configuration Information for New NPRACH Preamble

First, in relation to the random access procedure, the existing NB-IoT UE (e.g., a UE up to Rel-14) is configured to use a preamble (i.e., all 1 scrambled preamble) in which 1 is mapped to all symbols.

However, since the available frequency bandwidth of the NB-IoT system is narrower than that of the existing legacy LTE system, interference between NPRACH preambles (i.e., random access preambles) may appear larger than that of the legacy LTE system. In this case, the preamble in which 1 is mapped to all symbols may be due to a false alarm probability due to inter-cell interference.

In order to solve such a problem, a new preamble (that is, a preamble in which 1 is not mapped to all symbols) may be considered to be distinguished from the preamble in which 1 is mapped to all symbols. In this case, the new preamble may be configured to be cell-specific.

For example, the new preamble may be generated according to Equation 1 below.

$$x_{u,v}(n) = x_u((n + C_v) \bmod L_{RA}) \qquad \text{[Equation 1]}$$

$$x_u(i) = e^{-j\frac{\pi u i(i+1)}{L_{RA}}}, i = 0, 1, \ldots, L_{RA} - 1$$

In Equation 1, $x_{u,v}(n)$ may mean the new preamble, that is, the preamble generated based on the sequence in which all elements are not configured to 1, and $C_v$ may mean the cyclic shift value. In addition, the $L_{RA}$ value may be given as a value of 839 or 139 according to the PRACH preamble format. Additionally, the cyclic shift value may be given according to Equation 2 below.

$$C_v = \begin{cases} vN_{CS} & v = 0, 1, \ldots, \lfloor L_{RA}/N_{CS} \rfloor - 1, \\ & N_{CS} \neq 0 \end{cases} \text{ for unrestricted sets} \quad \text{[Equation 2]} \\ 0 & N_{CS} = 0 \quad \text{for unrestricted sets} \\ d_{start}\lfloor v/n_{shift}^{RA} \rfloor + & \\ (v \bmod n_{shift}^{RA})N_{CS} & v = 0, 1, \ldots, w - 1 \quad \text{for restricted sets type } A \text{ and } B \\ \overline{d}_{start} + (v - w)N_{CS} & v = w, \ldots, w + \overline{n}_{shift}^{RA} - 1 \quad \text{for restricted sets type } B \\ \overline{\overline{d}}_{start} + (v - w - \overline{n}_{shift}^{RA})N_{CS} & v = w + \overline{n}_{shift}^{RA}, \ldots, w + \overline{n}_{shift}^{RA} + \overline{\overline{n}}_{shift}^{RA} - 1 \quad \text{for restricted sets type } B \end{cases}$$

$$w = n_{shift}^{RA} n_{group}^{RA} + \overline{n}_{shift}^{RA}$$

As mentioned above, the new preamble may be generated using the Zadoff-Chu sequence, the DFT sequence, or the like. In this case, the length of the sequence may be adjusted according to the size of the generated preamble.

Hereinafter, for convenience of description, the preamble in which 1 is mapped to all symbols is referred to as a 'legacy NPRACH preamble' and the new preamble is referred to as a 'new NPRACH preamble'. Here, the NPRACH preamble may correspond to the random access preamble.

In this case, the legacy NPRACH preamble may mean a preamble scrambled using the sequence in which all elements are configured to 1 and the new NPRACH preamble may mean a preamble scrambled using the sequence in which all elements are not equally configured to 1.

Configuration information related to such a legacy NPRACH preamble may be delivered through the system information block (SIB).

For example, 'NPRACH-ConfigSIB-NB-r13' is transmitted to 'RadioResourceConfigCommonSIB-NB-r13' of SIB2-NB, and 'NPRACH-Parameters-NB-r13' is transmitted to 'NPRACH-ConfigSIB-NB-r13' for each repetition level. In this case, offset information of a subcarrier capable of transmitting the NPRACH preamble, such as 'nprach-SubcarrierOffset-r13', the number of subcarriers capable of transmitting the NPRACH preamble, such as is included in the 'NPRACH-Parameters-NB-r13', and the NPRACH, such as 'nprach-NumSubcarriers-r13', and the like are transmitted to 'NPRACH-Parameters-NB-r13'.

When the eNB may use both the legacy NPRACH preamble and the new NPRACH preamble, a case where the eNB should also deliver the configuration information for the new NPRACH preamble may occur in addition to the configuration information for the legacy NPRACH preamble.

In this case, a method for performing a configuration related to the new NPRACH preamble may be as follows.

(Method 1) Method for Independently Configuring Configuration Information for New NPRACH Preamble First, a method for configuring to allocate independent (or separated) resources according to the legacy NPRACH preamble and the new NPRACH preamble may be considered. That is, the resource of the NPRACH preamble may be independently allocated according to the scrambling sequence (or scrambling sequence group).

In this case, for the new NPRACH preamble, a new parameter that may be configured independently of the configuration for the legacy NPRACH preamble may be used.

The new parameter may be configured to deliver all of the configuration information (e.g., the offset information of the subcarrier capable of transmitting the NPRACH preamble, the number of subcarriers, etc.) for the legacy NPRACH preamble. The value indicating such configuration information may be configured to different values (that is, independently) between the new NPRACH preamble and the legacy NPRACH preamble.

Therefore, the eNB may freely deliver a configuration for which frequency resource region to occupy for each preamble to the UE. Further, since the resource region for the new NPRACH preamble does not overlap with the resource region for the legacy NPRACH preamble, the probability of confusing both the resource regions may be lowered in terms of the UE. In this case, due to separate configuration information for the new NPRACH preamble, the total amount of configuration information may increase.

(Method 2) Method for Configuring Configuration Information for New NPRACH Preamble by Subset of Configuration Information for Legacy NPRACH Preamble Next, a new parameter may be used, which may the new NPRACH preamble by the subset for the legacy NPRACH preamble.

The new parameter may configure the new NPRACH preamble as the form of the subset of specific information among configuration information for the legacy NPRACH preamble.

For example, it is assumed that the offset information of the subcarrier capable of transmitting the legacy NPRACH preamble is used similarly to the related art. In this case, some subcarrier(s) among subcarriers available for transmission of the legacy NPRACH preamble may be configured to be used for transmission of the new NPRACH preamble.

In this case, the eNB may transmit to the UE new offset information (i.e., additional offset information up to the subcarrier for transmission of the new NPRACH preamble) based on the offset of the subcarrier capable of transmitting the legacy NPRACH preamble.

In addition, in a system where only the legacy NPRACH preamble is used, random access identification information (Random Access ID (RA ID)) transmitted in legacy MAC Random Access Response (MAR) is distinguished (i.e., FDMed) according to the location of the subcarrier.

In this regard, when the new NPRACH preamble described above is added, the random access identification information (RA ID) transmitted in the MAC RAR may be configured to be distinguished (i.e., CDMed) according to the preamble as well as the location of the subcarrier.

Since even UEs using different preambles (i.e., legacy NPRACH preambles and new NPRACH preambles) may have the same subcarrier location, it may be necessary to distinguish the RA ID according to the preamble.

Further, when the UE may not receive a response (i.e., RAR) to the random access preamble transmitted to the eNB, the UE needs to retransmit the random access preamble. That is, the UE needs to re-attempt transmission of the random access preamble. Hereinafter, in this specification, retransmitting the random access preamble or repeating the transmission of the random access preamble may mean re-attempting the transmission of the random access preamble.

In this case, the UE may select one of the legacy NPRACH preamble and the new NPRACH preamble as a preamble to be retransmitted. In this regard, a method for selecting the preamble may be as follows.

First, the UE may be configured to transmit the same preamble as the previously transmitted preamble while performing power ramping. In this case, since the UE knows the configuration information on the preamble already transmitted, it may be reasonable.

In this case, when power ramping is performed for a specific preamble and a maximum number of retransmissions (i.e., a maximum repetition number) is reached, the corresponding UE may be configured to transmit another preamble.

Next, the UE may be configured to use a preamble different from the previously transmitted preamble. In this case, when the UE does not receive the RAR even though the UE transmits another preamble, the UE may be configured to transmit the preamble by performing power ramping.

In other words, if the RAR is not received even though all types of preambles are transmitted, the UE may be configured to transmit the preamble after performing power ramping.

In this case, the terminal needs to know the configuration information for the other preambles in addition to the preamble transmitted in advance.

In addition, when using the PDCCH order, a method may be considered in which the eNB transmit information indicating the type (i.e., legacy NPRACH preamble or new NPRACH preamble) of the preamble to be transmitted by the UE to the UE through the DCI for transmitting the corresponding information.

In addition, depending on the purpose (or reason) of the NPRACH preamble transmission, the legacy NPRACH preamble or the new NPRACH preamble may be selected.

For example, in the case of initial access, the UE may be configured to randomly select any one of the legacy NPRACH preamble or the new NPRACH preamble (or based on UE ID) and transmit the selected preamble.

As another example, in case of the scheduling request (SR) or the PDCCH order, the UE may be configured to transmit a preamble configured through higher layer signaling and/r physical layer signaling (e.g., DCI).

For reference, randomly selecting any one of the legacy NPRACH preamble and the new NPRACH preamble may be efficient with respect to load balancing of the eNB. Specifically, when UEs use only the new NPRACH preamble because of good interference cancellation performance of the new NPRACH preamble, operation complexity of the eNB may be excessively increased.

Therefore, in order to optimize the degree of freedom and/or performance of the base station, it may be desirable for the UEs to use the legacy NPRACH preamble and the new NPRACH preamble in a balanced manner rather than being concentrated on either preamble.

In consideration of such a point, a method for delivering information on whether the eNB supports the legacy NPRACH preamble and new NPRACH preamble to the UE through the system information block (SIB) may also be additionally considered.

In other words, a new field (e.g., a new NPRACH preamble support configuration field) may be added to a predetermined SIB (e.g., SIB2-NB) and the eNB may be configured to transmit information on whether to support the new NPRACH preamble and/or information on the preamble to be used by the UE through the new field. In this case, the new field may be optionally transmitted.

Specific examples of the method are as follows.

For example, an eNB that does not support the new NPRACH preamble or an eNB that supports the new NPRACH preamble but does not want the UE (e.g., an advanced UE) to use the new NPRACH preamble may be configured to use the new field added to the SIB.

In this case, since the new field added to the SIB is not transmitted in terms of the UE (i.e., the advanced UE) supporting the new PRACH preamble, the corresponding UE may know that the eNB wants to use only the legacy NPRACH preamble. In this case, the UE may perform the RACH process using the legacy NPRACH preamble even if the UE is the advanced UE supporting the new PRACH preamble.

As another example, the eNB that wants the advanced UE to use the new NPRACH preamble among eNBs supporting the new NPRACH preamble may be configured to support the new NPRACH preamble and deliver whether the new NPRACH is available to the UE by delivering information to the new field added to the SIB.

In this case, the new field may be configured with 1-bit information for configuring all advanced UEs to use only the new NPRACH preamble or configuring all UEs to use both the legacy NPRACH preamble and the new NPRACH preamble.

Alternatively, when two UE groups exist based on the parameter (e.g., UE ID) that may distinguish the UE, the new field described above may be configured with 1-bit information for configuring one group to use only the new NPRACH preamble and the other group to use both the legacy NPRACH preamble and the new NPRACH preamble. In this case, the UE capable of interpreting the corresponding field may determine which group the UE belongs to and perform the RACH process using the preamble in a scheme configured by the eNB.

In addition, when the eNB supports an additional configuration (e.g., resource allocation configuration) for the new NPRACH preamble, the eNB may not deliver information indicating whether the eNB supports the new NPRACH preamble to the UE through an explicit field. In this case, the eNB may be configured to implicitly inform the UE whether to support the new NPRACH preamble through existence of the information field associated with the new NPRACH preamble.

In addition, when the PDCCH order is used, the UE may be configured to follow a preamble resource close to the PDCCH order or may be configured to use a preamble that is used for RRC connection setup.

Method for Transmitting Random Access Preamble by UE Considering New NPRACH Preamble The UE that uses only the legacy NPRACH preamble may receive, from the eNB, the configuration information for the existing defined legacy NPRACH preamble and transmit the legacy NPRACH preamble.

On the other hand, the UE capable of using both the legacy NPRACH preamble and the new NPRACH preamble may be configured to use the preamble configured by the eNB.

Hereinafter, when not only the legacy NPRACH preamble but also the new NPRACH preamble is configured together, an operation (i.e., an operation of attempting to transmit the random access preamble) of transmitting the random access preamble to the eNB will be described in detail.

Embodiments described hereinbelow are just distinguished for convenience of the description and some configurations or features of a predetermined embodiment may be included in other embodiments or may be replaced with corresponding configurations or features of other embodiments. That is, the embodiments described hereinbelow may be applied independently or in combination with each other.

First Embodiment

The UE may use (or select) a preamble for performing the RACH process based on the validity of the configuration information for the legacy NPRACH preamble and the configuration information for the new NPRACH preamble configured by the eNB.

The eNB may transmit a valid value only for the configuration information for the legacy NPRACH preamble and transmit an invalid value for the configuration information for the new NPRACH preamble. In this case, the UE may be configured to use the legacy NPRACH preamble.

In contrast, the eNB may transmit the valid value only for the configuration information for the new NPRACH preamble and may transmit the invalid value for the configuration information for the legacy NPRACH preamble. In this case, the UE may be configured to use the new NPRACH preamble.

In contrast, the eNB may transmit the valid value for both the configuration information for the legacy NPRACH preamble and the configuration information for the new NPRACH preamble. In this case, the UE may be configured to use a pre-promised (or defined) preamble. For example, if the configuration information for both preambles corresponds to the valid value, the UE may be configured to use the new PRACH preamble.

Alternatively, the UE may be preconfigured (or defined) not to expect that the valid value is not transmitted for both the configuration information for the legacy NPRACH preamble and the configuration information for the new NPRACH preamble.

Second Embodiment

Apart from the validities of the configuration information for the legacy NPRACH preamble and the configuration information for the new NPRACH preamble, a method of using a 1-bit new parameter to select any one of the legacy NPRACH preamble and the new NPRACH preamble may also be considered.

For example, the eNB may transmit the configuration information for each preamble including 1-bit information indicating whether each preamble is used. Specifically, when specific 1-bit information included in the configuration information for the new PRACH preamble indicates '0', this may indicate that the new PRACH preamble is not used by the UE.

In addition, when the eNB supports the new NPRACH preamble (or informs the UE of the information that the new NPRACH preamble may be supported), the following operations (hereinafter, a third embodiment, a fourth embodiment, a fifth embodiment, and a sixth embodiment) of the UE may be expected.

In this case, as mentioned above, the configuration for the new NPRACH preamble may be independently of the configuration for the legacy NPRACH preamble, or may be included in a subset of the configuration for the legacy NPRACH preamble.

Third Embodiment

When the eNB supports the new NPRACH preamble, the UE (i.e., the advanced UE) capable of supporting the new NPRACH preamble may be configured to use the new NPRACH preamble.

Alternatively, in this case, the UE may be configured to select and use any one of the new NPRACH preamble and the legacy NPRACH preamble randomly (or based on UE ID).

In addition, a method for transmitting, when the eNB delivers the configuration information for the new NPRACH preamble to the UE, information on a weight between the legacy NPRACH preamble and the new NPRACH preamble may also be considered. In this case, the UE may be configured to randomly use the preamble based on the received weight.

For example, it is assumed that all N NPRACH preambles are used. In this case, the eNB may be configured to transmit N−1 weighting factors (e.g., w1, w2, to $w_{N-1}$) to the UE through higher layer signaling (e.g., system information block (SIB) or RRC signaling).

In this case, the UE may be configured to determine a probability of using a specific NPRACH preamble using the received weighting factor. Specifically, the UE may determine the first NPRACH preamble with a probability of w1, the second NPRACH preamble with a probability of w2, and the N-th NPRACH preamble with a probability of $$\sum_{i=0}^{N-1} w_i.$$

In the case of using the method, there is an advantage that an efficient load balancing effect may be obtained than the case where the UE randomly selects the preamble without the weight.

Fourth Embodiment

When the eNB supports the new NPRACH preamble, the UE (i.e., the advanced UE) capable of supporting the new NPRACH preamble may be configured to use the new NPRACH preamble according to information (e.g., Reference Signal Received Power (RSRP) on received power or a repetition number (i.e., a retransmission number).

For example, when an RSRP level is less than or equal to a predetermined threshold, the UE may be configured to transmit the new NPRACH preamble.

As another example, when the transmission of the NPRACH preamble is repeatedly performed, the UE may be configured to transmit the new NPRACH preamble.

As yet another example, when the repetition number of the transmission of the NPRACH preamble is more than a predetermined threshold, the UE may be configured to transmit the new NPRACH preamble.

That is, referring to the fact that the new NPRACH preamble may be considered to reduce inter-cell interference, a UE existing in a cell center that is not expected to be received by an adjacent cell may be configured to transmit the legacy NPRACH preamble and if not, the UE may be configured to transmit the new NPRACH preamble. As an example, the UE existing in the cell center may mean a UE in which the RSRP is greater than or equal to a specific value or Tx power is equal to or less than a specific value.

Configuration information (e.g., an RSRP threshold value, a repetition number threshold value, or information on a preamble change depending on whether the repetition is performed) for supporting the method may be delivered to the UE through the NPRACH configuration information by the eNB or predetermined (or defined) on the system.

Fifth Embodiment

When the eNB supports the new NPRACH preamble, the UE (i.e., the advanced UE) capable of supporting the new NPRACH preamble may be configured to first transmit the new NPRACH preamble and then retransmit the legacy NPRACH preamble when the response (i.e., RAR) may not be received until a specific retransmission number (e.g., one retransmission, a maximum retransmission number, etc.) is reached.

Here, the specific retransmission number may mean a specific number of re-attempting (or repeating) message transmission for the RACH process using the new NPRACH preamble. In other words, when the UE may not receive the RAR, the UE may be configured to change the NPRACH preamble used based on a specific attempt number for a specific coverage enhanced level.

In this case, the information indicating the specific retransmission number may be transmitted by being included in the configuration information for the new NPRACH preamble and/or separate configuration information through higher layer signaling and/or physical layer signaling.

That is, the UE may be initially configured to transmit a predetermined default NPRACH preamble, and may be configured to transmit another NPRACH preamble if the response may not be received until the specific retransmission number is reached.

In this case, the UE may be configured to apply a ramp-up value (i.e., a power ramping step value) that is configured by using the preamble selected first and to be equally applied even to the changed preamble.

For example, when the specific retransmission number is configured to 2, the UE may transmit the preamble by applying the value ramped up twice to the changed preamble. That is, the UE may be configured to maintain the previous ramp-up value even for the changed preamble. As another example, when the specific retransmission number is configured to 0, the UE may be configured to sequentially perform transmission of the new NPRACH preamble and transmission of the legacy NPRACH preamble, and if the UE may not receive the response, perform power ramping and transmit the new NPRACH preamble.

Alternatively, the UE may be configured to newly the ramp-up value in the changed preamble.

For example, when the specific retransmission number is configured to 3, the UE may be configured to transmit the changed preamble with initial transmission power without maintaining the previous power-ramping value.

In order to receive the response to the NPRACH preamble faster, it may be desirable to maintain the existing ramp-up value. However, since a case in which even an existing ramp-up power value is not required may occur by changing the preamble, it may be desirable to newly apply the ramp-up value in terms of power saving.

The method may be equally applied to a scheme in which the new NPRACH preamble is configured to be transmitted when the UE initially transmits the legacy NPRACH preamble and then may not receive the response.

Sixth Embodiment

When the eNB supports the new NPRACH preamble, in a case where the UE (i.e., the advanced UE) capable of supporting the new NPRACH preamble initially transmits the new NPRACH preamble and then may not receive the response (i.e., RAR), the UE may configured to transmit the legacy NPRACH preamble.

That is, the UE may be configured to alternately transmit the preamble at the same CE level.

For example, when the UE transmits message 1 over M1 times (that is, repeats M1 times) using the new NPRACH preamble but may not receive the response, the UE may be configured to transmit message 1 over M1 times by using the legacy NPRACH preamble. Here, M1 may mean the maximum retransmission attempt number at the CE level.

That is, the UE may be configured to perform the maximum retransmission attempt number for the new NPRACH preamble and then perform the retransmission attempt for the legacy NPRACH preamble.

Here, transmitting message 1 over M1 times using the new NPRACH preamble by the UE may mean that the UE performs power ramping M1 times and repeatedly transmits message 1 using the new NPRACH preamble. In addition, transmitting message 1 over M1 times using the legacy NPRACH preamble by the UE may mean that the power ramping is performed again after returning to initial transmission power at the CE level and the legacy NPRACH preamble is repeatedly transmitted.

In this case, when the UE may not receive the response in spite of transmitting message 1 over M1 times by using the new NPRACH preamble, the UE may be configured to transmit message 1 over M2 times corresponding to a subsequent CE level by using the new NPRACH preamble.

That is, when the UE may not receive the response in spite performing transmission and/or retransmission for all types of preambles (at this time, performing power ramping every transmission) for a specific CE level, the UE may perform the preamble transmission again by changing the CE level. Here, changing the CE level may mean changing the number of the transmission repetition number of the preamble allocated in one attempt associated with the preamble transmission.

The method may be equally applied to a scheme in which the new NPRACH preamble is configured to be transmitted when the UE initially transmits the legacy NPRACH preamble and then may not receive the response.

In addition, whether to perform the power ramping described in the embodiments may be determined according to whether the UE changes the beam. In other words, when the UE repeatedly transmits the preamble, whether to perform the power ramping may vary depending on whether the UE changes a beam direction for transmitting the preamble.

For example, when the UE repeatedly transmits the preamble without changing the beam direction, the UE may be configured to perform power ramping during the preamble transmission. On the contrary, when the UE repeatedly transmits the preamble while changing the beam direction, the UE may be configured not to perform power ramping during the preamble transmission.

Further, in addition to the method described in the embodiments, when the eNB informs whether the UE or the UE group (e.g., UE ID group) capable of supporting the new NPRACH preamble uses only the new NPRACH preamble or uses the legacy NPRACH preamble together, the UE may be configured to operate as follows.

First, when the eNB delivers information indicating that only the new NPRACH preamble is to be used to the UE, the UE may be configured to use only the new NPRACH preamble.

On the contrary, when the eNB delivers information indicating that both the legacy NPRACH preamble and the new NPRACH preamble are to be used to the UE, the UE may be configured to randomly select and use one of the new NPRACH preamble and the legacy NPRACH preamble (like the methods described above).

As an example, in consideration of NPRACH transmission on a non-anchor carrier, the UE capable of supporting the new NPRACH preamble may be configured to preferentially select the non-anchor carrier including a resource for transmitting the new NPRACH preamble when selecting an NPRACH resource among multiple non-anchor carriers.

Further, whether to apply the method for changing the preamble as described above may vary depending on an operation mode in the UE in the NB-IoT.

For example, assuming that the new NPRACH preamble is introduced for the purpose of enhancing reliability that is degraded due to inter-cell interference, in an in-band operation mode or guard-band operation mode in which a lot of inter-cell interference may exist, the method for changing the preamble as described above may be applied.

In this case, in a stand-alone operation mode in which the influence of the inter-cell interference is small, the method for changing the preamble as described above may not be applied.

Alternatively, the eNB may instruct the UE to transmit message 1 while changing the type of preamble through higher layer signaling (e.g., system information block (SIB), RRC signaling, etc.) regardless of the operation mode of the UE.

Although in the methods described in this specification, a case where a new NPRACH format is formed by adding the new NPRACH preamble is considered, the methods may be equally applied even when a new NPRACH format including a new CP length is formed.

Figure 9:
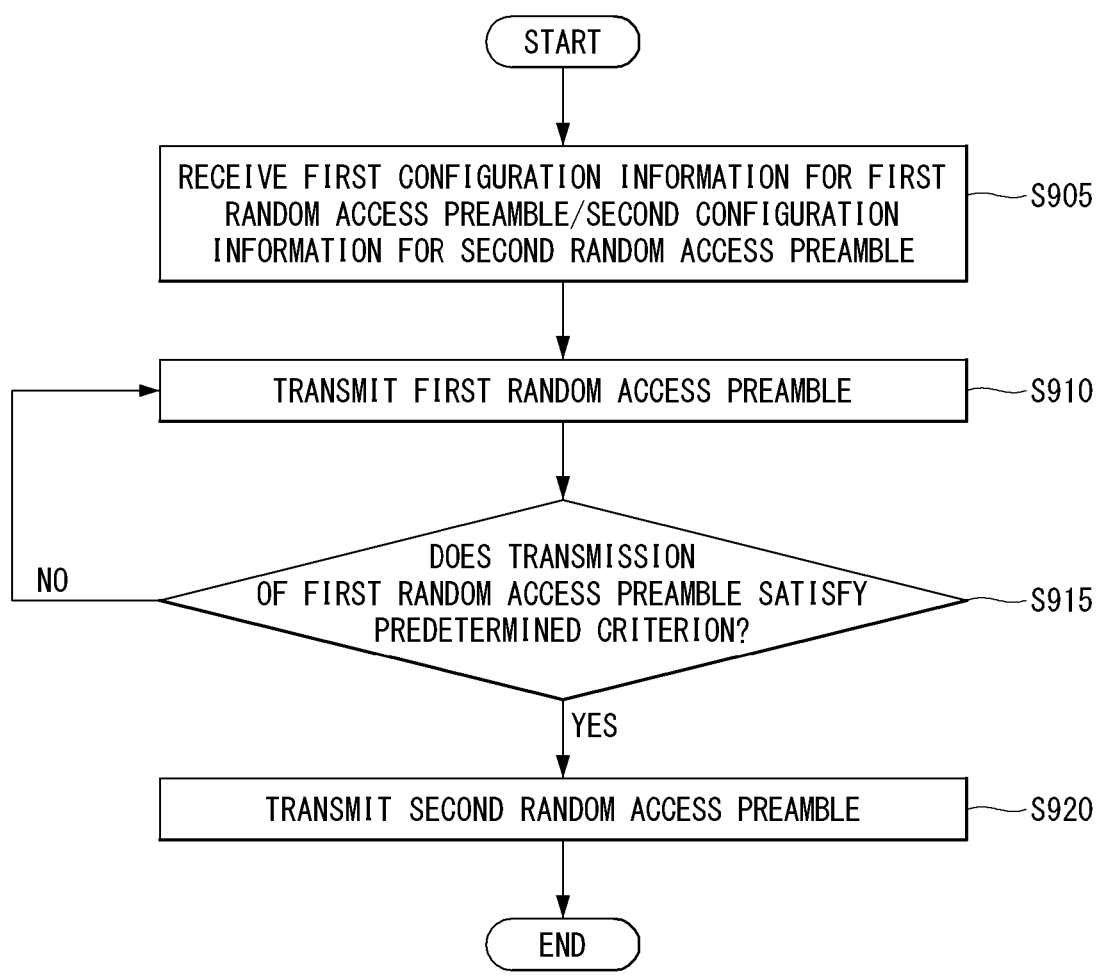
FIG. 9 illustrates one example of an operation flowchart for a method for transmitting, by a UE, a random access preamble in a wireless communication system to which a method proposed in this specification may be applied.

FIG. 9 illustrates one example of an operation flowchart for a method for transmitting, by a UE, a random access preamble in a wireless communication system to which a method proposed in this specification may be applied. FIG. 9 is just for convenience of the description and does not limit the scope of the present disclosure.

Referring to FIG. 9, it is assumed that the eNB and the UE support a first random access preamble and a second random access preamble. Here, the first random access preamble and the second random access preamble may mean the legacy NPRACH preamble and the new NPRACH preamble described above. That is, any one of the first random access preamble and the second random access preamble is generated based on the sequence in which all elements are not configured to 1.

In step S905, the UE may receive, from the eNB, first configuration information for the first random access preamble and second configuration information for the second random access preamble. For example, the UE may receive the configuration information for the legacy NPRACH preamble and the configuration information for the new NPRACH preamble described above. In this case, the configuration information may be configured according to method 1 or 2 described above.

In step S910, the UE may transmit, to the eNB, the first random access preamble by using the first configuration information. For example, the UE may attempt transmission of the legacy NPRACH preamble. In this case, the first random access preamble may correspond to a default random access preamble in the corresponding system.

Thereafter, in step S915, it may be determined whether the transmission of the first random access preamble satisfies a predetermined criterion.

Here, the predetermined criterion may be configured according to the embodiments described above. That is, the predetermined criterion may refer to a criterion for the UE to select the preamble when the response to the transmission of the first random access preamble is not received.

For example, the predetermined criterion may be configured based on a retransmission number (e.g., a maximum attempt number, etc.) for the transmission of the first random access preamble. In this case, configuration information for the predetermined criterion may be included in the first configuration information for the first random access preamble.

When the predetermined criterion is not satisfied in step S915, the UE may perform retransmission (i.e., re-attempt of the transmission of the first random access preamble) for the first random access preamble by returning to step S910.

On the contrary, when the predetermined criterion is satisfied in step S915, in step S920, the UE may transmit the second random access preamble to the eNB. In other words, when the predetermined criterion is satisfied, the UE may perform an RACH process by changing the type of preamble.

Overview of Devices to which Present Disclosure is Applicable

Figure 10:
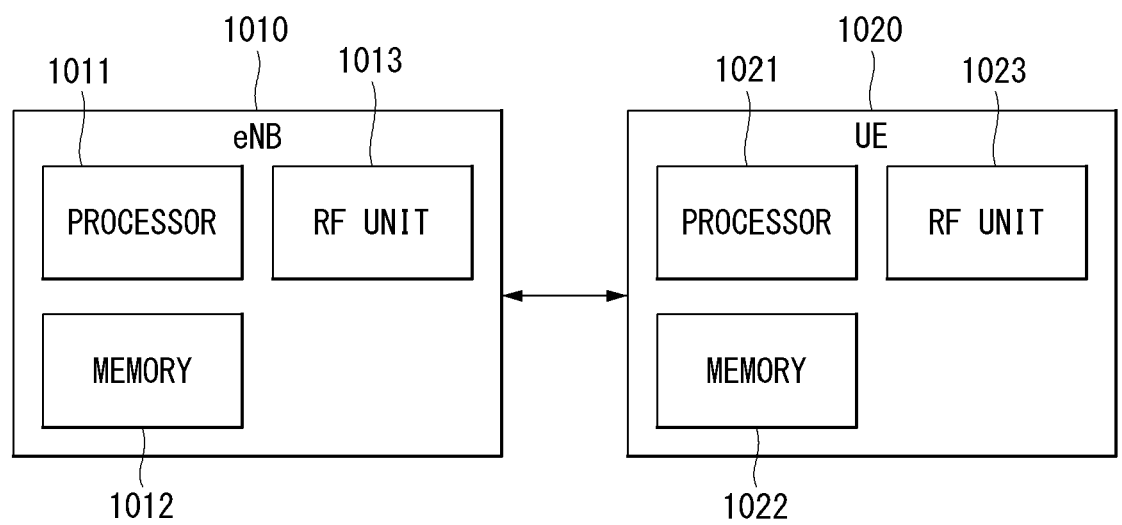
FIG. 10 illustrates a block diagram of a wireless communication device to which methods proposed by this specification may be applied.

FIG. 10 illustrates a block diagram of a wireless communication device to which methods proposed by this specification may be applied.

Referring to FIG. 10, a wireless communication system includes an eNB 1010 and multiple UEs 1010 positioned within an area of the eNB 1020.

The eNB 1010 includes a processor 1011, a memory 1012, and a radio frequency (RF) unit 1013. The processor 1011 implements a function, a process, and/or a method which are proposed in FIGS. 1 to 9 above. The layers of the wireless interface protocol may be implemented by the processor 1011. The memory 1012 is connected with the processor 1011 to store various pieces of information for driving the processor 1011. The RF unit 1013 is connected with the processor 1011 to transmit and/or receive a radio signal.

The UE 1020 includes a processor 1021, a memory 1022, and an RF unit 1023.

The processor 1021 implements a function, a process, and/or a method which are proposed in FIGS. 1 to 9 above. The layers of the wireless interface protocol may be implemented by the processor 1021. The memory 1022 is connected with the processor 1021 to store various pieces of information for driving the processor 1021. The RF unit 1023 is connected with the processor 1021 to transmit and/or receive a radio signal.

The memories 1012 and 1022 may be positioned inside or outside the processors 1011 and 1021 and connected with the processors 1011 and 1021 by various well-known means. Further, the base station 1010 and/or the UE 1020 may have a single antenna or multiple antennas.

Figure 11:
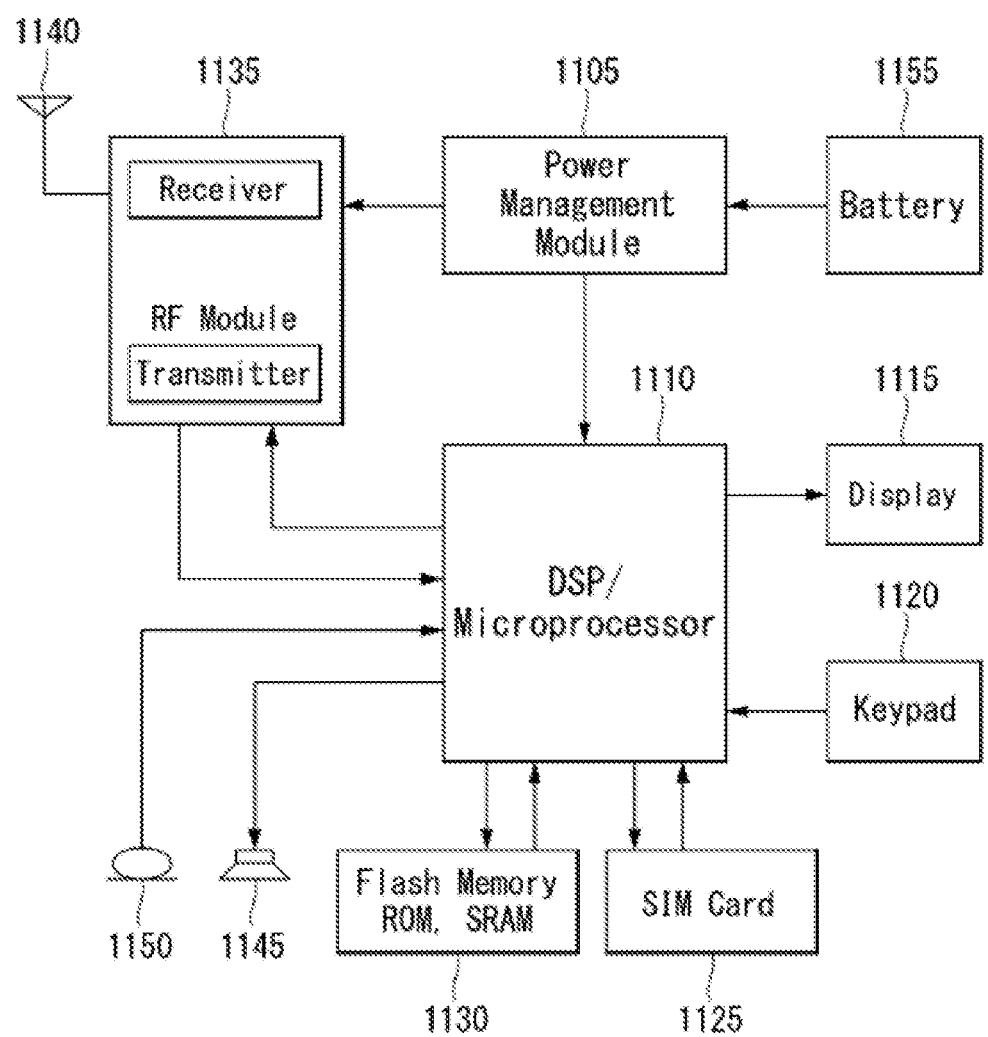
FIG. 11 illustrates a block diagram of a communication device according to an embodiment of the present disclosure.

FIG. 11 illustrates a block diagram of a communication device according to an embodiment of the present disclosure.

In particular, FIG. 11 is a diagram more specifically illustrating the UE of FIG. 10 above.

Referring to FIG. 11, the UE may be configured to include a processor (or a digital signal processor (DSP) 1110, an RF module (or RF unit) 1135, a power management module 1105, an antenna 1140, a battery 1155, a display 1115, a keypad 1120, a memory 1130, a subscriber identification module (SIM) card 1125 (this component is optional), a speaker 1145, and a microphone 1150. The UE may also include a single antenna or multiple antennas.

The processor 1110 implements a function, a process, and/or a method which are proposed in FIGS. 1 to 9 above. Layers of a wireless interface protocol may be implemented by the processor 1110.

The memory 1130 is connected with the processor 1110 to store information related to an operation of the processor 1110. The memory 1130 may be positioned inside or outside the processor 1110 and connected with the processor 1110 by various well-known means.

A user inputs command information such as a telephone number or the like by, for example, pressing (or touching) a button on the keypad 1120 or by voice activation using the microphone 1150. The processor 1110 receives such command information and processes to perform appropriate functions including dialing a telephone number. Operational data may be extracted from the SIM card 1125 or the memory 1130. In addition, the processor 1110 may display command information or drive information on the display 1115 for the user to recognize and for convenience.

The RF module 1135 is connected with the processor 1110 to transmit and/or receive an RF signal. The processor 1110 transfers the command information to the RF module 1135 to initiate communication, for example, to transmit wireless signals constituting voice communication data. The RF module 1135 is constituted by a receiver and a transmitter for receiving and transmitting the wireless signals. The antenna 1140 functions to transmit and receive the wireless signals. Upon receiving the wireless signals, the RF module 1135 may transfer the signal for processing by the processor 1110 and convert the signal to a baseband. The processed signal may be converted into to audible or readable information output via the speaker 1145.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

The method for transmitting the random access preamble in the wireless communication system of the present disclosure, which supports NB-IoT is described primarily with an example applied to a 3GPP LTE/LTE-A system, but the method can be applied to various wireless communication systems in addition to the 3GPP LTE/LTE-A system.

The invention claimed is:

1. A method of performing, by a user equipment (UE), a random access procedure in a wireless communication system supporting a narrowband-Internet of things (NB-IoT), the method comprising:
    receiving, from a base station (BS), configuration information for a random access preamble, the configuration information including first configuration information for a first random access preamble format and second configuration information for a second random access preamble format, wherein the first random access preamble format is based on a first length of sequence and the second random access preamble format is based on a second length of sequence, and the first length is shorter than the second length; and
    transmitting, to the BS, a first random access preamble based on the first random access preamble format or a second random access preamble based on the second random access preamble format,
    wherein a second resource for the second random access preamble format is configured not to overlap with a first resource for the first random access preamble format.

2. The method of claim 1, wherein any one of the first random access preamble and the second random access preamble is generated, by the UE, based on a sequence in which all elements are not configured to 1.

3. The method of claim 1, wherein information regarding a specific retransmission number of the first random access preamble is included in the first configuration information, and
    wherein the second random access preamble is transmitted after the first random access preamble is retransmitted by the specific retransmission number.

4. The method of claim 3, wherein the first random access preamble is power-ramped by the specific retransmission number and is transmitted by the specific retransmission number, and
    wherein the second random access preamble is transmitted with transmission power which is power-ramped by the specific retransmission number.

5. The method of claim 3, wherein the first random access preamble is power-ramped by the specific retransmission number and is transmitted by the specific retransmission number, and
    wherein the second random access preamble is transmitted with predetermined initial transmission power.

6. The method of claim 3, wherein the specific retransmission number is a maximum attempt number predetermined for the transmission of the first random access preamble.

7. The method of claim 1, further comprising:
    based on the random access procedure based on PDCCH (Physical Downlink Control Channel) order:
    receiving, from the BS, information for indicating the first random access preamble format or the second random access preamble format via downlink control information.

8. A user equipment (UE) configured to perform a random access procedure in a wireless communication system supporting a narrowband-Internet of things (NB-IoT), the UE comprising:
    at least one transceiver;
    at least one processor; and
    at least one computer memory operably connectable to the at least one processor and storing instructions that, based on being executed by the at least one processor, perform operations comprising:
    receiving, from a base station (BS) via the at least one transceiver, configuration information for a random access preamble, the configuration information including first configuration information for a first random access preamble format and second configuration information for a second random access preamble format, wherein the first random access preamble format is based on a first length of sequence and the second random access preamble format is based on a second length of sequence, and the first length is shorter than the second length; and
    transmitting, to the BS via the at least one transceiver, a first random access preamble based on the first random access preamble format or a second random access preamble based on the second random access preamble format,
    wherein a second resource for the second random access preamble format is configured not to overlap with a first resource for the first random access preamble format.

9. The UE of claim 8, wherein the operations further comprise:
    based on the random access procedure based on PDCCH (Physical Downlink Control Channel) order:
    receiving, from the BS, information for indicating the first random access preamble format or the second random access preamble format via downlink control information.

10. An apparatus configured to control a user equipment (UE) to perform a random access procedure in a wireless communication system supporting a narrowband-Internet of things (NB-IoT), the apparatus comprising:
    one or more processors; and
    one or more computer memories operatively coupled to the one or more processors and storing instructions that, based on being executed by the one or more processors, control the UE to perform operations comprising,
    receiving, from a base station (BS), configuration information for a random access preamble, the configuration information including first configuration information for a first random access preamble format and second configuration information for a second random access preamble format, wherein the first random access preamble format is based on a first length of sequence and the second random access preamble format is based on a second length of sequence, and the first length is shorter than the second length; and
    transmitting, to the BS, a first random access preamble based on the first random access preamble format or a second random access preamble based on the second random access preamble format,
    wherein a second resource for the second random access preamble format is configured not to overlap with a first resource for the first random access preamble format.

11. The apparatus of claim 10, wherein the operations further comprise:
    based on the random access procedure based on PDCCH (Physical Downlink Control Channel) order:
    controlling the UE to receive, from the BS, information for indicating the first random access preamble format or the second random access preamble format via downlink control information.

* * * * *